United States Patent
Kayano et al.

(10) Patent No.: US 6,866,811 B2
(45) Date of Patent: Mar. 15, 2005

(54) METHOD FOR INJECTION-MOLDING AN ARTICLE HAVING A HOLLOW PORTION

(75) Inventors: Yoshihiro Kayano, Hiratsuka (JP); Hiroyuki Imaizumi, Hiratsuka (JP); Kazuaki Ochiai, Hiratsuka (JP)

(73) Assignee: Mitsubishi Engineering-Plastics Corp., Tokyo (JP)

( * ) Notice: Subject to any disclaimer, the term of this patent is extended or adjusted under 35 U.S.C. 154(b) by 240 days.

(21) Appl. No.: 09/842,255

(22) Filed: Apr. 26, 2001

(65) Prior Publication Data

US 2001/0050450 A1 Dec. 13, 2001

(30) Foreign Application Priority Data

Apr. 28, 2000 (JP) ........................... 2000-129734
Apr. 17, 2001 (JP) ........................... 2001-117677

(51) Int. Cl.⁷ .............................................. B29C 45/13
(52) U.S. Cl. ..................... 264/513; 264/510; 264/572
(58) Field of Search ................. 264/513, 510, 264/572, 40.1; 425/130, 573; 249/131

(56) References Cited

U.S. PATENT DOCUMENTS

| 4,201,209 A | 5/1980 | LeVeen et al. |
| 4,275,030 A * | 6/1981 | Mares ......................... 264/250 |
| 4,385,025 A | 5/1983 | Salerno et al. |
| 4,778,366 A | 10/1988 | Weaver |
| 4,792,425 A | 12/1988 | Weaver |
| 4,830,807 A | 5/1989 | Warren et al. |
| 4,993,931 A | 2/1991 | Belcher |
| 5,057,266 A | 10/1991 | Belcher |
| 5,251,954 A | 10/1993 | Vande Kopple et al. |
| 5,456,957 A | 10/1995 | Jackson et al. |
| 5,566,954 A | 10/1996 | Hahn |
| 5,711,907 A | 1/1998 | Nozaki et al. |
| 5,799,385 A * | 9/1998 | Vecchiarino et al. ........... 29/469 |
| 6,063,315 A * | 5/2000 | Keller et al. ................ 264/40.1 |
| 6,368,093 B1 * | 4/2002 | Vecchiarino et al. ......... 425/130 |
| 6,475,413 B1 * | 11/2002 | Siano ......................... 264/40.1 |
| 2003/0209841 A1 * | 11/2003 | Porter ......................... 264/513 |

FOREIGN PATENT DOCUMENTS

JP            10-281139        10/1998

* cited by examiner

Primary Examiner—Michael P. Colaianni
Assistant Examiner—Monica A. Fontaine
(74) Attorney, Agent, or Firm—Wenderoth, Lind & Ponack, L.L.P.

(57) ABSTRACT

An injection-molding apparatus comprises a mold assembly having a first-molten-resin injection portion for injecting a first molten thermoplastic resin into a cavity of the mold assembly, a second-molten-resin injection portion for injecting a second molten thermoplastic resin into the cavity, and a pressurized-fluid introducing portion for introducing a pressurized fluid into the second molten thermoplastic resin injected into the cavity. The injection-molding apparatus also comprises a first injection cylinder communicating with the first-molten-resin injection portion, and a second injection cylinder communicating with the second-molten-resin injection portion.

23 Claims, 30 Drawing Sheets

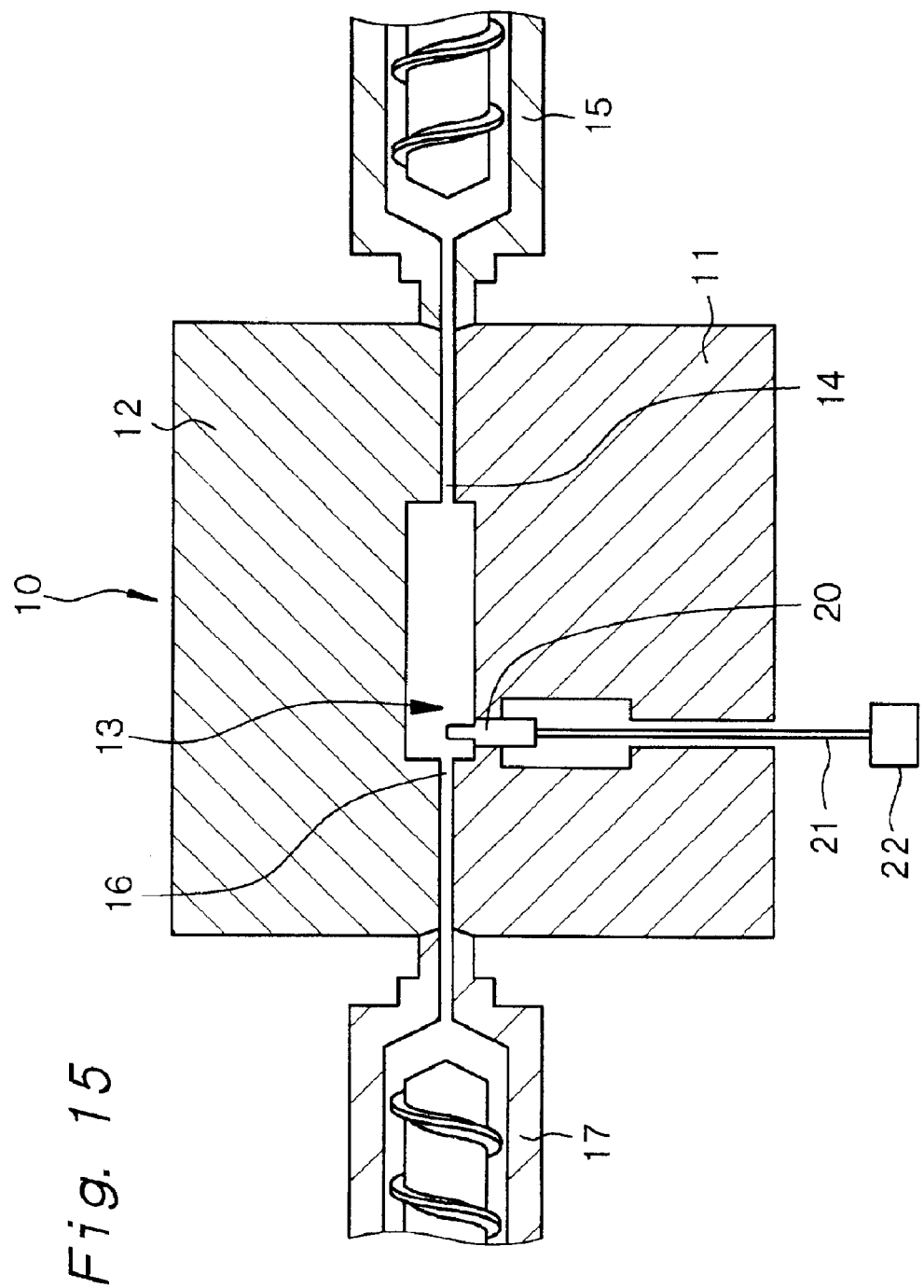

Fig. 28
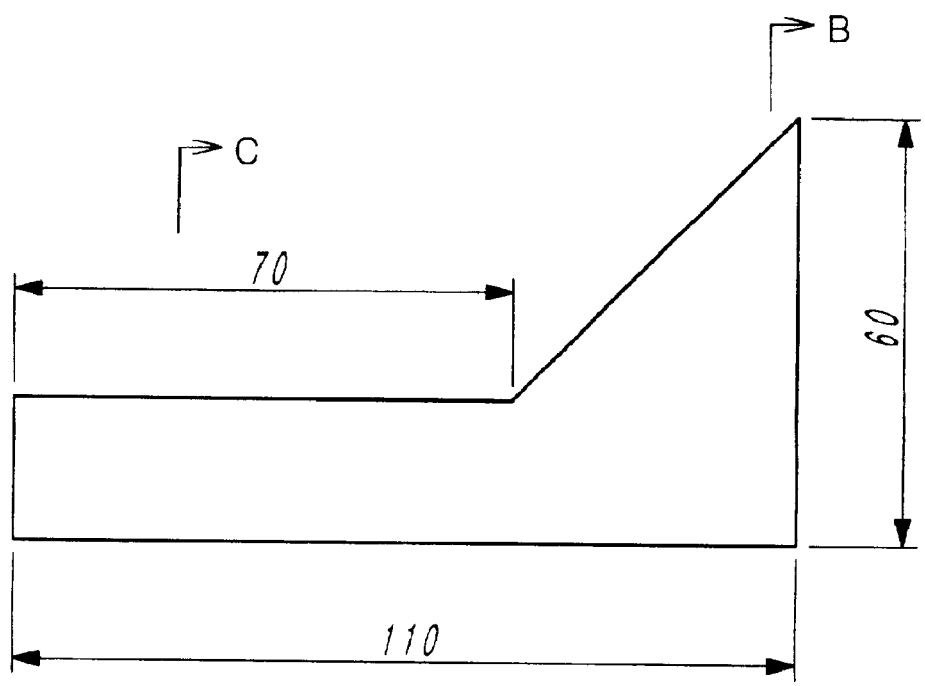
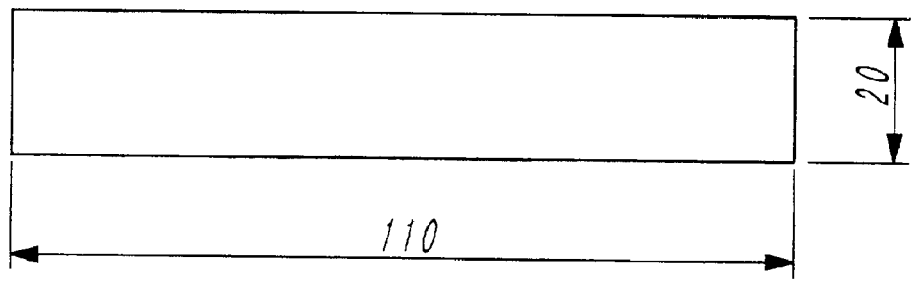

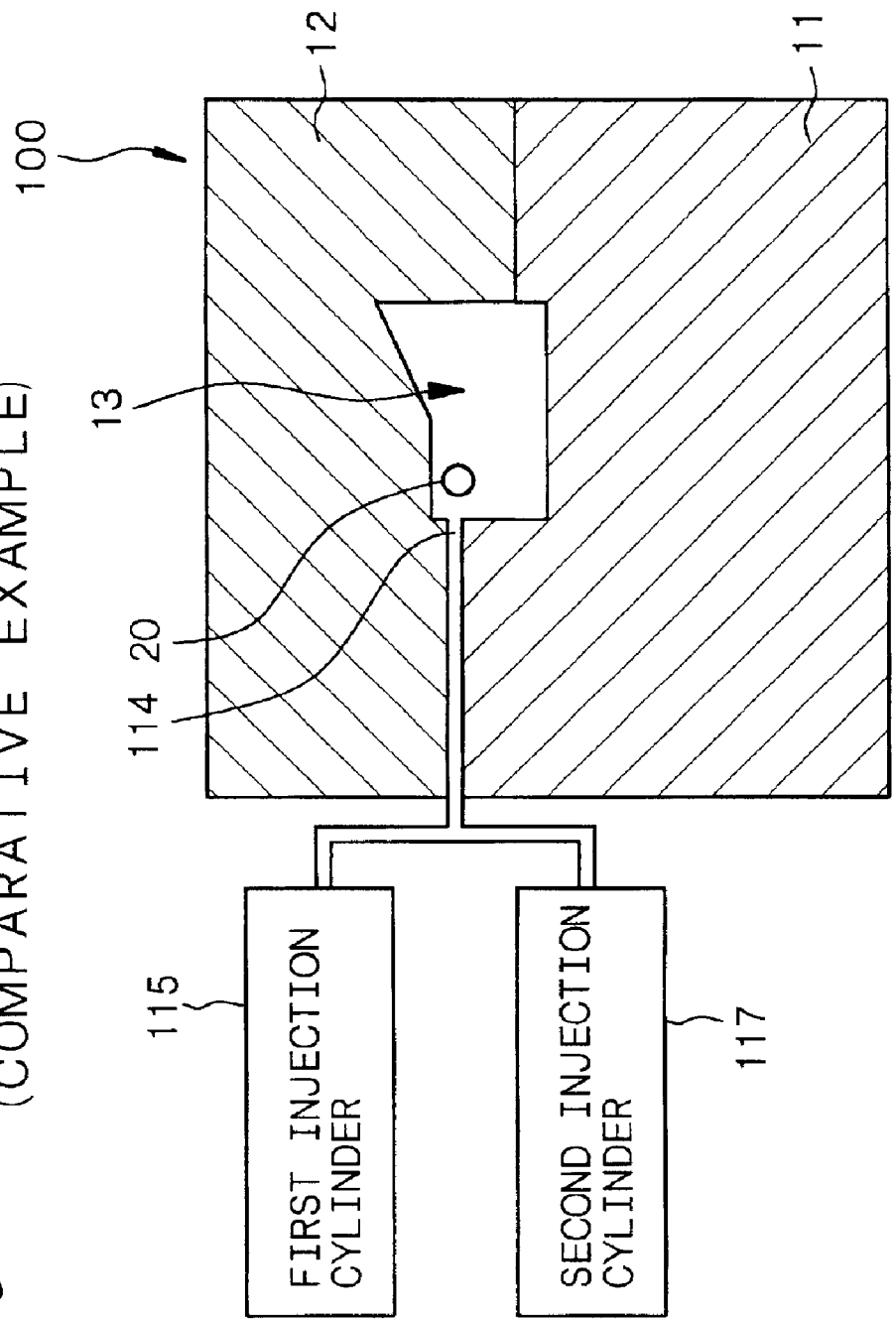
Fig. 30 (COMPARATIVE EXAMPLE)

METHOD FOR INJECTION-MOLDING AN ARTICLE HAVING A HOLLOW PORTION

BACKGROUND OF THE INVENTION

1. Field of the Invention

The present invention relates to a method for injection-molding an article having a hollow portion, and more specifically, a method for injection-molding an article having a hollow portion according to a kind of two-color molding method, and an injection-molding apparatus suiTable for carrying out the above method.

2. Description of Related Art

Conventionally, an article having a hollow portion, in which the article is required not only to have surface properties such as an excellent appearance, slidability and chemical resistance but also to have rigidity, is produced by the following method. That is, (1) a method in which a first member for covering the surface properties (generally, an article having a solid portion) and a second member for covering the rigidity (generally, an article having a hollow portion) are separately injection-molded and then assembled, (2) a method in which a first member for covering the surface properties (generally, an article having a solid portion) is prepared in advance, the first member is inserted into a mold and a second member for covering the rigidity (generally, an article having a hollow portion) is integrally injection-molded, and (3) a sandwich gas injection method.

JP-A-10-281139 (Japanese Patent Application No. 9-90679) disclose a method of producing a paper feeding roller, in which a soft material that comes to be relatively soft after being solidified is injected into a cavity. Then, a resin material that comes to be relatively hard after being solidified is injected into the soft material, and then a gas is introduced into the resin material to break a layer of the soft material with the resin material and press the soft material to a wall surface of the cavity with the resin material.

The above method (1) requires an assembly step, and an article produced by the assembly generally has a problem in that the strength thereof is poor as compared with a molded article which is integrally formed. In the above method (2), for producing (molding) the first member and the second member, it is required to carry out injection molding twice or it is required to prepare the first member beforehand, so that the operation is complicated and that an additional production cost is required. In the above method (3), it is difficult to control the thickness of the portion covering the surface properties, and it is also difficult to constitute a desired portion of a molded article from a material (resin) having excellent surface properties.

The method of producing a paper feeding roller, disclosed in JP-A-10-281139, is basically a combination technology of a sandwich molding method and a gas injection method, and the roller has a structure in which the relatively soft material has a hollow portion and covers nearly the entire region of the roller itself and a support shaft made of the relatively hard resin material. In the paper feeding roller, however, the support shaft is desirably hard, and it is difficult to constitute a desired portion from a desired material in the production method disclosed in JP-A-10-281139. Further, in the sandwich molding method, it is difficult to control the thickness of the soft material, and it is difficult to form the soft material on a surface of the resin material with positional accuracy and thickness accuracy.

SUMMARY OF THE INVENTION

It is therefore an object of the present invention to provide a method for injection-molding an article having a hollow portion, in which desired portions of the molded article made of two thermoplastic resins can be reliably constituted of the two thermoplastic resins and the thickness of each of the portions of the molded article made of the two thermoplastic resins can be accurately and easily controlled, and an injection-molding apparatus suiTable for carrying out the above injection molding method.

The injection-molding apparatus of the present invention for achieving the above object comprises a mold assembly having a first-molten-resin injection portion for injecting a first molten thermoplastic resin into a cavity of the mold assembly, a second-molten-resin injection portion for injecting a second molten thermoplastic resin into the cavity, and a pressurized-fluid introducing portion for introducing a pressurized fluid into the second molten thermoplastic resin injected into the cavity.

The injection-molded apparatus of the present invention for achieving the above object also comprises a first injection cylinder communicating with the first-molten-resin injection portion, and a second injection cylinder communicating with the second-molten-resin injection portion.

The injection-molding apparatus of the present invention may be constituted to have a movable partition member to be positioned in a portion of the cavity between a first cavity portion in which the first molten thermoplastic resin can occupy in the cavity and a second cavity portion in which the second molten thermoplastic resin can occupy in the cavity. In the above constitution, one surface of the partition member may have convexo-concave shapes for improving the junction strength between a portion of the molded article made of the first thermoplastic resin and a portion of the molded article made of the second thermoplastic resin. The convexo-concave shapes formed on the surface of the partition member are transferred to the first or second molten thermoplastic resin that is injected into the cavity to come in contact with the partition member. In a molded article as an end product, therefore, the portion of the molded article made of the first thermoplastic resin and the portion of the molded article made of the second thermoplastic resin are engaged with each other so that the junction strength between these portions can be improved. Further, for attaining the reliable movement of the partition member, the direction in which the partition member is movable is preferably nearly at right angles with the direction of a pressure exerted on the partition member by the first molten thermoplastic resin injected from the first-molten-resin injection portion into the first cavity portion, the direction of a pressure exerted on the partition member by the second molten thermoplastic resin injected from the second-molten-resin injection portion into the second cavity portion, or the direction of a pressure exerted on the partition member by the pressurized fluid introduced from the pressurized-fluid introducing portion. When the above partition member is moved (extracted or withdrawn) before it comes in contact with the second molten thermoplastic resin, the direction in which the partition member is movable is nearly at right angles with the direction of a pressure exerted on the partition member by the first molten thermoplastic resin injected from the first-molten-resin injection portion into the first cavity portion. Further, when the partition member is moved (extracted or withdrawn) before it comes in contact with the first molten thermoplastic resin, the direction in which the partition member is movable is nearly at right angles with the direction of a pressure exerted on the partition member by the second molten thermoplastic resin injected from the second-molten-resin injection portion into the second cavity portion or the direction of a pressure exerted on the partition member by the pressurized fluid introduced from the pressurized-fluid introducing portion.

According to a first aspect of the present invention, there is provided a method for injection-molding a molded article having a hollow portion (to be sometimes abbreviated as "first injection-molding method of the present invention" hereinafter), where the method uses the above injection-molding apparatus of the present invention. That is, the first injection-molding method of the present invention is a method for injection-molding a molded article having a hollow portion by means of an injection-molding apparatus. The apparatus according to the first aspect of the present invention comprises a mold assembly having a first-molten-resin injection portion for injecting a first molten thermoplastic resin into a cavity of the mold assembly, a second-molten-resin injection portion for injecting a second molten thermoplastic resin into the cavity, and a pressurized-fluid introducing portion for introducing a pressurized fluid into the second molten thermoplastic resin injected into the cavity. The apparatus also comprises a first injection cylinder communicating with the first-molten-resin injection portion, and a second injection cylinder communicating with the second-molten-resin injection portion.

The first injection-molding method comprises the step (a) of: injecting the first molten thermoplastic resin from the first injection cylinder into the cavity through the first-molten-resin injection portion.

The first injection-molding also comprises the step (b) of initiating the injection of the second molten thermoplastic resin from the second injection cylinder into the cavity through the second-molten-resin injection portion, without bringing the second molten thermoplastic resin into contact with the first molten thermoplastic resin injected into the cavity, concurrently with the start of the injection of the first molten thermoplastic resin into the cavity, during the injection thereof or after completion of the injection thereof.

The first injection-molding also comprises the step (c) of introducing the pressurized fluid into the second molten thermoplastic resin in the cavity from the pressurized-fluid introducing portion during the injection of the second molten thermoplastic resin into the cavity or after completion of the injection thereof, thereby forming the hollow portion inside the second thermoplastic resin.

The first injection-molding method of the present invention may include an embodiment in which the first thermoplastic resin is in a molten state when the first thermoplastic resin comes in contact with the second molten thermoplastic resin in step (c). That is, the above embodiment satisfies $T_1 \geq T_{s1}$ in which $T_{s1}$ is a solidification temperature of the first thermoplastic resin and $T_1$ is a temperature of a portion of the first thermoplastic resin which portion comes in contact with the second molten thermoplastic resin when the first thermoplastic resin comes in contact with the second molten thermoplastic resin. By the above embodiment, a portion of the molded article made of the first thermoplastic resin and a portion of the molded article made of the second thermoplastic resin are melt-attached to each other so that the junction strength between these two portions can be improved.

Alternatively, the first injection-molding method of the present invention may include an embodiment in which a portion of the first thermoplastic resin which comes in contact with the second molten thermoplastic resin comes into a re-melted state due to the contact thereof with the second molten thermoplastic resin in step (c). That is, the above embodiment satisfies $T'_1 < T_{s1}$ in which $T'_1$ is a temperature of a portion ("solidified layer" hereinafter) of the first thermoplastic resin which is to come in contact with the second molten thermoplastic resin at a time immediately before the first thermoplastic resin comes into contact with the second molten thermoplastic resin. And, due to the contact with the second molten thermoplastic resin, the of the first thermoplastic resin which portion has come into contact with the second molten thermoplastic resin comes to have a temperature $T''_1$ which temporarily satisfies $T''_1 \geq T_{s1}$. The solidified layer is required to have a thickness that satisfies $T''_1 \geq T_{s1}$. The above temperature and the above thickness change depending upon the form of a molded article and the temperature of the second molten thermoplastic resin. For example, the above thickness is desirably approximately from 0.1 mm to 1 mm. Desirably, the value of $(T_{s1} - T'_1)$ is 0° C. to 30° C., preferably 10° C. to 20° C. When the second molten thermoplastic resin comes into contact with the first thermoplastic resin, the temperature of a portion of the second molten thermoplastic resin which comes into contact with the first thermoplastic resin is required to be a temperature that satisfies $T''_1 \geq T_{s1}$. By the above embodiment, a portion of the molded article made of the first thermoplastic resin and a portion of the molded article made of the second thermoplastic resin are melt-attached to each other, so that the junction strength between these two portions can be improved.

A volume of the cavity is taken as $V_c$, a volume of the first cavity portion that the first thermoplastic resin can occupy in the cavity is taken as $V_{c1}$, and a volume of the second cavity portion that the second molten thermoplastic resin can occupy in the cavity is taken as $V_{c2}$. Further, a volume of the first molten thermoplastic resin to be injected into the cavity is taken as $V_1$, and a volume of the second molten thermoplastic resin to be injected into the cavity is taken as $V_2$. The first injection-molding method of the present invention satisfies $V_{c1} + V_{c2} = V_c$.

FIGS. 1A to 1C, 2A to 2C, 3A to 3C, 4A to 4C, 5A, 5B, 6A, 6B, 7A, 7B, 8A and 8B show timings of the start and completion of the injection of the first molten thermoplastic resin and the second molten thermoplastic resin, and the start of the introduction of the pressurized fluid in the first injection-molding method of the present invention. In FIGS. 1A to 1C, 2A to 2C, 3A to 3C, and 4A to 4C, the volume $V_2$ of the second molten thermoplastic resin to be injected into the cavity and the volume $V_{c2}$ of the second cavity portion that the second molten thermoplastic resin can occupy in the cavity have a relationship of $V_2 < V_{c2}$. That is, the second cavity portion is not fully filled with the second molten thermoplastic resin. In FIGS. 5A, 5B, 6A, 6B, 7A, 7B, 8A and 8B, $V_2 = V_{c2}$ exists. That is, the second cavity portion is fully filled with the second molten thermoplastic resin.

The start of the injection of the second molten thermoplastic resin into the cavity in step (b) can be made concurrently with the injection of the first molten thermoplastic resin into the cavity as shown in FIGS. 1A, 1B and 1C or FIGS. 5A and 5B. Alternatively, the above start of the injection of the second molten thermoplastic resin can be made during the injection of the first molten thermoplastic resin into the cavity as shown in FIGS. 2A, 2B and 2C or FIGS. 6A and 6B. Further, the above start of the injection of the second molten thermoplastic resin can be made after the completion of the injection of the first molten thermoplastic resin into the cavity as shown in FIGS. 3A, 3B and 3C, FIGS. 4A, 4B and 4C, FIGS. 7A and 7B, or FIGS. 8A and 8B. In embodiments shown in FIGS. 3A, 3B and 3C or FIGS. 7A and 7B, the above start of the injection of the send molten thermoplastic resin is made concurrently with the completion of the injection of the first molten thermoplastic resin into the cavity, and in embodiments shown in FIGS. 4A, 4B and 4C, or FIGS. 8A and 8B, the above start of the injection of the second molten thermoplastic resin is made some time later after the completion of the injection of the first molten thermoplastic resin into the cavity.

The introduction of the pressurized fluid into the second molten thermoplastic resin in the cavity in step (c) can be made during the injection of the second molten thermoplastic resin into the cavity as shown in FIGS. 1A, 2A, 3A and 4A. Even if the relationship of $V_2=V_{c2}$ exits, the above introduction can be made during the injection of the second molten thermoplastic resin into the cavity. Alternatively, the above introduction of the pressurized fluid can be made after the completion of the second molten thermoplastic resin into the cavity as shown in FIGS. 1B and 1C, FIGS. 2B and 2C, FIGS. 3B and 3C, FIGS. 43 and 4C, FIGS. 5A and 5B, FIGS. 6A and 6B, FIGS. 7A and 7B or FIGS. 8A and 8B. In embodiments shown in FIGS. 1B, 2B, 3B, 4B, 5A, 6A, 7A and 8A, the above introduction of the pressurized fluid is made concurrently with the completion of the injection of the second molten thermoplastic resin, and in embodiments shown in FIGS. 1C, 2C, 3C, 4C, 5B, 6B, 7B and 8B, the above introduction of the pressurized liquid is made some time later after the completion of the injection of the second molten thermoplastic resin.

In the first injection-molding method of the present invention, when the injection of the second molten thermoplastic resin into the cavity is started, the second molten thermoplastic resin injected into the cavity does not come into contact with the first molten thermoplastic resin injected into the cavity. Therefore, a desired portion of the molded article can be reliably constituted of the first and second thermoplastic resins, and the form (for example, thickness, width and length) of the portions of the molded article which are made of the first and second thermoplastic resins can be accurately and easily controlled. The above state can be attained by optimizing the layout of the first-molten-resin injection portion and the second-molten-resin injection portion in the mold assembly.

In embodiments shown in FIGS. 1A to 1C, 2A to 2C, 3A to 3C, and 4A to 4C, the timing of contacting between the first thermoplastic resin and the second thermoplastic resin in the cavity comes after the start of the introduction of the pressurized fluid into the second molten thermoplastic resin in the cavity in step (c). In embodiments shown in FIGS. 5A, 5B, 6A, 6B, 7A, 7B, 8A and 8B, the timing of the above contacting comes on or around a time of completion of the injection of the second molten thermoplastic resin into the cavity. In embodiments shown in FIGS. 1A to 1C, 2A to 2C, 3A to 3C, and 4A to 4C, the timing of the cavity being filled with the first thermoplastic resin and the second thermoplastic resin comes after the start of the introduction of the pressurized fluid into the second molten thermoplastic resin in the cavity in step (c). In embodiments shown in FIGS. 5A, 5B, 6A, 6B, 7A, 7B, 8A and 8B, the above timing comes on or around the completion of the injection of the second molten thermoplastic resin into the cavity. In embodiments shown in FIGS. 5A, 5B, 6A, 6B, 7A, 7B, 8A and 8B, the hollow portion is formed inside the second molten thermoplastic resin mainly for compensating for the volume shrinkage of the second thermoplastic resin caused by the cooling and solidification thereof.

According to a second aspect of the present invention, there is provided a method for injection-molding a molded article having a hollow portion (to be abbreviated as "second injection-molding method of the present invention" hereinafter) by means of the injection-molding apparatus having the partition member incorporated therein. That is, the second injection-molding method of the present invention for achieving the above object is a method for injection-molding a molded article having a hollow portion by means of an injection-molding apparatus. The injection-molding apparatus according to the second aspect of the present invention comprises a mold assembly having a first-molten-resin injection portion for injecting a first molten thermoplastic resin into a cavity of the mold assembly, a second-molten-resin injection portion for injecting a second molten thermoplastic resin into the cavity, and a pressurized-fluid introducing portion for introducing a pressurized fluid into the second molten thermoplastic resin injected into the cavity. The injection-molding apparatus also comprises a first injection cylinder communicating with the first-molten-resin injection portion, and a second injection cylinder communicating with the second-molten-resin injection portion. The injection-molding apparatus also comprises a movable partition member to be disposed in a portion of the cavity that portion is between a first cavity portion that the first molten thermoplastic resin can occupy in the cavity and a second cavity portion that the second molten thermoplastic resin can occupy in the cavity.

The second injection-molding method comprises the step (a) of disposing the movable partition member in the portion of the cavity that is between the first cavity portion that the first molten thermoplastic resin can occupy in the cavity and the second cavity portion that the second molten thermoplastic resin can occupy in the cavity.

The second injection-molding method also comprises the step (b) of injecting the first molten thermoplastic resin from the first injection cylinder into the first cavity portion through the first-molten-resin injection portion.

The second injection-molding method also comprises the step (c) of extracting the partition member from the cavity.

The second injection-molding method also comprises the step (d) of injecting the second molten thermoplastic resin into the portion of the cavity that the partition member occupied and into the second cavity portion from the second injection cylinder through the second-molten-resin injection portion.

Further, the second injection-molding method comprises the step (e) of introducing the pressurized fluid into the second molten thermoplastic resin in the cavity from the pressurized-fluid introducing portion during the injection of the second molten thermoplastic resin or after the completion of the injection thereof, thereby to form the hollow portion inside the second thermoplastic resin.

According to a third aspect of the present invention for achieving the above object, there is provided a method for injection-molding a molded article having a hollow portion (to be abbreviated as "third injection-molding method of the present invention" hereinafter) by means of the injection-molding apparatus having the partition member incorporated. The third injection-molding method differs from the second injection-molding method in that the order of the injection of the first molten thermoplastic resin and the injection of the second molten thermoplastic resin is reversed. That is, the third injection-molding method of the present invention is a method for injection-molding a molded article having a hollow portion by means of an injection-molding apparatus The apparatus according to the third aspect of the present invention comprises a mold assembly having a first-molten-resin injection portion for injecting a first molten thermoplastic resin into a cavity of the mold assembly, a second-molten-resin injection portion for injecting a second molten thermoplastic resin into the cavity, and a pressurized-fluid introducing portion for introducing a pressurized fluid into the second molten thermoplastic resin injected into the cavity. The apparatus according to the third aspect of the present invention comprises a first injection cylinder communicating with the first-molten-resin injection portion, and a second injection cylinder communicating with the second-molten-resin injection portion. The apparatus according to the third aspect of the present invention comprises a movable partition member to be disposed in a portion of the cavity that portion is between a first cavity portion that the first molten thermoplastic resin can occupy in the cavity and a second cavity portion that the second molten thermoplastic resin can occupy in the cavity.

The third injection-molding method comprises the step (a) of disposing the movable partition member in the portion of the cavity that is between the first cavity portion in which the first molten thermoplastic resin can occupy in the cavity and the second cavity portion in which the second molten thermoplastic resin can occupy in the cavity.

The third injection-molding method also comprises the step (b) of injecting the second molten thermoplastic resin from the second injection cylinder into the second cavity portion through the second-molten-resin injection portion. The third injection-molding method also comprises the step (c) of introducing the pressurized fluid into the second molten thermoplastic resin in the second cavity portion from the pressurized-fluid introducing portion during the injection of the second molten thermoplastic resin into the second cavity portion or after the completion of the injection thereof, thereby to form the hollow portion inside the second thermoplastic resin. The third injection-molding method also comprises the step (d) of extracting the partition member from the cavity.

The third injection-molding method also comprises the step (e) of injecting the first molten thermoplastic resin into the portion of the cavity in which the partition member occupied and into the first cavity portion from the first injection cylinder through the first-molten-resin injection portion.

In the third injection-molding method of the present invention, preferably, the above step (d) is preceded by the discharging of the pressurized fluid from the hollow portion formed inside the second thermoplastic resin order to prevent damage where the pressure of the pressurized fluid in the hollow portion may cause on a portion of the molded article which is made of the second thermoplastic resin.

In the second injection-molding method of the present invention, the partition member is preferably extracted or withdrawn from the cavity in the above step (c) after the first thermoplastic resin is solidified to such an extent that the movement of the partition member does not impair the form of the first thermoplastic resin. That is, it is preferred to extract or withdraw the partition member from the cavity after the injection of the first molten thermoplastic resin into the first cavity portion is completed and a certain period of time passes. The injection of the second molten thermoplastic resin into the portion of the cavity and the second cavity portion may be started concurrently with the completion of the extraction of the partition member or after a certain period of time passes.

In the third injection-molding method of the present invention, the partition member is preferably extracted or withdrawn from the cavity in the above step (d) after the second thermoplastic resin is solidified to such an extent that the movement of the partition member does not impair the form of the second thermoplastic resin. That is, it is preferred to extract or withdraw the partition member from the cavity after the injection of the second molten thermoplastic resin into the second cavity portion is completed and a certain period of time passes. The injection of the first molten thermoplastic resin into the portion of the cavity and the first cavity portion may be started concurrently with the extraction of the partition member or after a certain period of time passes.

In the second injection-molding method of the present invention, preferably, a portion of the first thermoplastic resin which comes in contact with the second molten thermoplastic resin comes to be in a re-melted state due to its contact with the second molten thermoplastic resin in the step (d). That is, the above embodiment satisfies $T'_1 < T_{s1}$ in which $T'_1$ is a temperature of a portion (solidified layer) of the first thermoplastic resin which is to come in contact with the second molten thermoplastic resin at a time immediately before the first thermoplastic resin comes into contact with the second molten thermoplastic resin. And, due to the contact with the second molten thermoplastic resin, the portion of the first thermoplastic resin which has come into contact with the second molten thermoplastic resin comes to have a temperature $T''_1$ which temporarily satisfies $T''_1 \geq T_{s1}$. The solidified layer is required to have a thickness that satisfies $T''_1 \geq T_{s1}$. The above temperature and the above thickness change depending upon the form of a molded article and the temperature of the second molten thermoplastic resin. For example, the above thickness is desirably approximately from 0.1 mm to 1 mm. Desirably, the value of $(T_{s1} - T'_1)$ is 0° C. to 30° C., preferably 10° C. to 20° C. When the second molten thermoplastic resin comes into contact with the first thermoplastic resin, the temperature of a portion of the second molten thermoplastic resin which comes into contact with the first thermoplastic resin is required to be a temperature that satisfies $T''_1 \geq T_{s1}$. By the above embodiment, a portion of the molded article made of the first thermoplastic resin and a portion of the molded article made of the second thermoplastic resin are melt-attached to each other, so that the junction strength between these two portions can be improved.

In the third injection-molding method of the present invention, a portion of the second thermoplastic resin which comes in contact with the first molten thermoplastic resin preferably comes to be in a re-melted state due to its contact with the first molten thermoplastic resin in step (e). That is, the above embodiment satisfies $T'_2 < T_{s2}$ in which $T_{s2}$ is a solidification temperature of the second thermoplastic resin and $T'_2$ is a temperature of a portion of the second thermoplastic resin which is to come in contact with the first molten thermoplastic resin at a time immediately before the second thermoplastic resin comes into contact with the first molten thermoplastic resin. And, due to the contact with the first molten thermoplastic resin, the portion (solidified layer) of the second thermoplastic resin which has come into contact with the first molten thermoplastic resin comes to have a temperature $T''_2$ which temporarily satisfies $T''_2 \geq T_{s2}$. The solidified layer is required to have a thickness that satisfies $T''_2 \geq T_{s2}$. The above temperature and the above thickness change depending upon the form of a molded article and the temperature of the first molten thermoplastic resin. For example, the above thickness is desirably approximately from 0.1 mm to 1 mm. Desirably, the value of $(T_{s2} - T'_2)$ is 0° C. to 30° C., preferably 10° C. to 20° C. When the first molten thermoplastic resin comes into contact with the second thermoplastic resin, the temperature of a portion of the first molten thermoplastic resin which comes into contact with the second thermoplastic resin is required to be a temperature that satisfies $T''_2 \geq T_{s2}$. By the above embodiment, a portion of the molded article made of the first thermoplastic resin and a portion of the molded article made of the second thermoplastic resin are melt-attached to each other so that the junction strength between these two portions can be improved.

The second injection-molding method of the present invention may have a constitution in which the surface of the partition member which is to come in contact with the first molten thermoplastic resin has convexo-concave shapes. On the other hand, the third injection-molding method of the present invention may have a constitution in which that surface of the partition member which is to come in contact with the second molten thermoplastic resin has convexo-concave shapes. The convexo-concave shapes formed on the surface of the partition member are transferred to the first or second molten thermoplastic resin that is injected into the cavity to come in contact with the partition member. In a molded article as an end product, therefore, a portion of the molded article made of the first thermoplastic resin and a portion of the molded article made of the second thermoplastic resin are reliably engaged with each other so that the junction strength between these portions can be improved. Further, since the junction area increases, the strength against peeling increases.

Further, in the second injection-molding method of the present invention, the direction in which the partition member is movable is preferably nearly at right angles with the direction of a pressure exerted on the partition member by the first molten thermoplastic resin injected from the first-molten-resin injection portion into the first cavity portion. In the third injection-molding method of the present invention, the direction in which the partition member is movable is preferably nearly at right angles with the direction of a pressure exerted on the partition member by the second molten thermoplastic resin injected from the second-molten-resin injection portion into the second cavity portion, or the direction of a pressure exerted on the partition member by the pressurized fluid introduced from the pressurized-fluid introducing portion. In this manner, the partition member can be reliably moved.

A volume of the cavity is taken as $V_c$, a volume of the first cavity portion that the first molten thermoplastic resin can occupy in the cavity is taken as $V_{c1}$, a volume of the second cavity portion that the second thermoplastic resin can occupy in the cavity is taken as $V_{c2}$, and a volume of the portion of the cavity that the partition member occupies is taken as $V_p$. Further, a volume of the first molten thermoplastic resin to be injected into the cavity is taken as $V_1$, and a volume of the second molten thermoplastic resin to be injected into the cavity is $V_2$. The second or third injection-molding method of the present invention satisfies $V_{c1}+V_{c2}+V_p=V_c$.

FIGS. 9A, 9B, 10A, 10B, 11A, 11B and 11C show timings of the start and completion of the injection of the first molten thermoplastic resin and the second molten thermoplastic resin, the start of the introduction of the pressurized fluid, and the movement of the partition member in the second injection-molding method of the present invention. FIGS. 12A, 12B, 13A, 13B, 14A, 14B and 14C show timings of the start and completion of the injection of the first molten thermoplastic resin and the second molten thermoplastic resin, the start of the introduction of the pressurized fluid, and the movement of the partition member in the third injection-molding method of the present invention. In FIGS. 9A, 9B, 10A, 10B, 12A, 12B, 13A and 13B, the volume $V_2$ of the second molten thermoplastic resin to be injected into the cavity and the volume $V_{c2}$ of the second cavity portion that the second molten thermoplastic resin can occupy in the cavity have a relationship of $V_2 < V_{c2}$. That is, the second cavity portion is not fully filled with the second molten thermoplastic resin. In FIGS. 11A, 11B, 11C, 14A, 14B and 14C, $V_2 = V_{c2}$ exists. That is, the second cavity portion is fully filled with the second molten thermoplastic resin. In embodiments shown in FIGS. 11A, 11B, 11C, 12A, 12B, 13A, 13B, 14A, 14B and 14C, the hollow portion is formed inside the second molten thermoplastic resin mainly for compensating for the volume shrinkage of the second thermoplastic resin caused by cooling and solidification thereof.

In FIGS. 9A, 9B, 10A, 11A and 11B, the injection of the second molten thermoplastic resin is started immediately after completion of the movement of the partition member. In FIGS. 10B and 11C, the injection of the second molten thermoplastic resin is started after the movement of the partition member is completed and a certain period of time passes. In FIGS. 12A, 12B, 13A, 14A and 14B, the injection of the first molten thermoplastic resin is started immediately after the completion of the movement of the partition member. In FIGS. 13B and 14C, the injection of the first molten thermoplastic resin is started after the movement of the partition member is completed and a certain period of time passes.

In step (e) of the second injection-molding method of the present invention or step (c) of the third injection-molding method of the present invention, the introduction of the pressurized fluid into the second molten thermoplastic resin may be carried out during the injection of the second molten thermoplastic resin into the cavity as shown in FIG. 9A and FIG. 12A. Even if the relationship of $V_2 = V_{c2}$, the above introduction of the pressurized fluid can be carried out during the injection of the second molten thermoplastic resin into the cavity. Alternatively, the above introduction may be carried out after the completion of the injection of the second molten thermoplastic resin into the cavity as shown in FIGS. 9B, 10A, 10B, 11A, 11B, 11C, 12B, 13A, 13B, 14A, 14B and 14C. In embodiments shown in FIGS. 9B, 11A, 12B and 14A, the above introduction of the pressurized fluid is carried out concurrently with completion of the injection of the second molten thermoplastic resin, and in embodiments shown in FIGS. 10A, 10B, 11B, 11C, 13A, 13B, 14B and 14C, the above introduction of the pressurized fluid is carried out some time later after the completion of the injection of the second molten thermoplastic resin.

In the second or third injection-molding method of the present invention, the first or second molten thermoplastic resin is injected in a state where the cavity is separated (partitioned) into two spaces by the partition member, whereby the desired portions of the molded article can be reliably made of the first and second thermoplastic resins, and whereby the forms (for example, thickness, width and length) of the portions of the molded article which are made of the first and second thermoplastic resins can be accurately and easily controlled.

In the first, second or third injection-molding method of the present invention (to be sometimes generally simply referred to as "injection-molding method of the present invention" hereinafter), the pressurized fluid is discharged from the system a predetermined period of time after the start of introduction of the pressurized fluid. Further, after the first and second thermoplastic resins in the cavity are cooled to solidness, the mold assembly is opened, and the molded article is taken out of the mold assembly.

In the injection-molding method of the present invention, the first thermoplastic resin and the second thermoplastic resin can be selected from known crystalline thermoplastic resins and non-crystalline thermoplastic resins. The crystalline thermoplastic resin includes polyolefin resins such as a polyethylene resin and a polypropylene resin; polyamide resins such as polyamide 6, polyamide 66 and polyamide MXD6; a polyoxymethylene (polyacetal) resin; polyester resins such as a polyethylene terephthalate (PET) resin and a polybutylene terephthalate (PBT) resin; and a polyphenylene sulfide resin. The non-crystalline thermoplastic resin includes styrene-containing resins, a methacrylic resin, a polycarbonate resin, a modified PPE resin and an elastomer. The thermoplastic resin may contain a stabilizer, an ultraviolet absorbent, a mold release agent and a pigment. Further, the thermoplastic resin may contain inorganic fiber(s) and inorganic filler(s) or inorganic filler(s) such as a glass fiber, glass beads, a carbon fiber, wollastonite, an aluminum borate whisker, a potassium titanate whisker fiber, a basic magnesium sulfate whisker fiber, a calcium silicate whisker, a calcium sulfate whisker, mica, kaolin and calcium carbonate. When a portion of the molded article which is made of the first thermoplastic resin is required to have surface properties such as slidability and chemical resistance, the first thermoplastic resin is preferably selected from the crystalline thermoplastic resins. When a portion of the molded article which is made of the second thermoplastic resin is required to have rigidity, the second thermoplastic resin preferably contains an inorganic fiber.

In the injection-molding method of the present invention, the pressurized fluid is preferably a substance that is a gas at room temperature under atmospheric pressure and is neither reactive nor mixable with the thermoplastic resin used. Specific examples of the pressurized fluid include nitrogen gas, air, carbon dioxide gas and helium, while nitrogen gas or helium gas is preferred in view of safety and economic performances.

With regard to the position of the pressurized-fluid introducing portion in the mold assembly, the injection-molding apparatus or the injection-molding method of the present invention includesa constitution in which the pressurized-fluid introducing portion is disposed such that the top end portion of the pressurized-fluid introducing portion is positioned in the second second-molten-resin injection portion.

Alternatively, the injection-molding apparatus or the injection-molding method of the present invention can also include a constitution in which the pressurized-fluid introducing portion is disposed such that the top end portion of the pressurized-fluid introducing portion is positioned in or near a wall surface of the cavity.

Alternatively, the injection-molding apparatus or the injection-molding method of the present invention can also include a constitution in which the pressurized-fluid introducing portion is disposed such that the top end portion of the pressurized-fluid introducing portion is positioned in a top end portion of the second injection cylinder.

BRIEF DESCRIPTION OF THE DRAWINGS

The present invention will be explained hereinafter with preferred Examples and with reference to the drawings.

FIG. 15 is a conceptual view of an injection-molding apparatus of Example 1.

FIG. 17, is a conceptual view of the injection-molding apparatus, etc., for explaining the injection-molding method of Example 1.

FIG. 20, is a conceptual view of the injection-molding apparatus, etc., for explaining the injection-molding method of Example 3.

FIG. 21, is a conceptual view of the injection-molding apparatus, etc., for explaining the injection-molding method of Example 3.

FIG. 22, is a conceptual view of the injection-molding apparatus, etc., for explaining the injection-molding method of Example 3.

FIG. 24, is a conceptual view of the injection-molding apparatus, etc., for explaining the injection-molding method of Example 5.

FIG. 25, is a conceptual view of the injection-molding apparatus, etc., for explaining the injection-molding method of Example 5.

FIG. 26, is a conceptual view of the injection-molding apparatus, etc., for explaining the injection-molding method of Example 5.

FIG. 28 is an illustration for showing a size of a cavity (or a molded article) of a mold assembly in Examples 3 to 6.

FIG. 30 is a conceptual view of an injection-molding apparatus used in a Comparative Example.

DESCRIPTION OF THE PREFERRED EMBODIMENTS

EXAMPLE 1

Figure 1A:
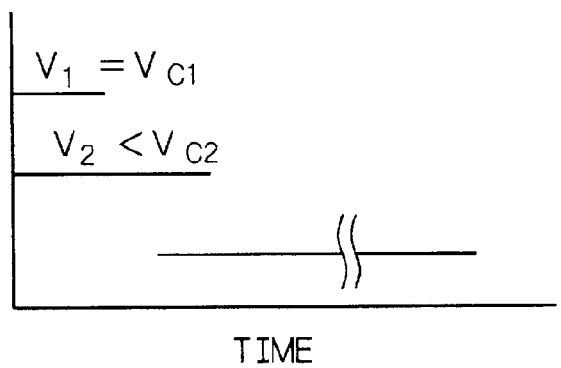
FIGS. 1A, 1B and 1C show timings of the start and completion of an injection of a first molten thermoplastic resin and a second molten thermoplastic resin, and the start of an introduction of a pressurized fluid in the first injection-molding method of the present invention.

Example 1 is concerned with the injection-molding apparatus of the present invention and the first injection-molding method of the present invention. FIG. 15 shows a conceptual view of an injection-molding apparatus of Example 1. The injection-molding apparatus has a mold assembly 10, a first injection cylinder 15 and a second injection cylinder 17. The mold assembly 10 further has a cavity 13. More specifically, the mold assembly 10 comprises a fixed mold member 11 and a movable mold member 12, and when the fixed mold member 11 and the movable mold member 12 are clamped, the cavity 13 is formed. The mold assembly 10 further has a first-molten-resin injection portion 14 for injecting a first molten thermoplastic resin into the cavity 13, a second-molten-resin injection portion 16 for injecting a second molten thermoplastic resin into the cavity 13 and a pressurized-fluid introducing portion (gas injection nozzle 20) for introducing a pressurized fluid into the second molten thermoplastic resin injected into the cavity 13. The first injection cylinder 15 communicates with the first-molten-resin injection portion 14, and the second injection cylinder 17 communicates with the second-molten-resin injection portion 16. In Example 1, the first-molten-resin injection portion 14 and the second-molten-resin injection portion 16 have a side gate structure. The illustration of other elements of the injection-molding apparatus is omitted. The gas injection nozzle 20 is a gas injection nozzle for introducing, through a top end portion thereof, the pressurized fluid into the molten thermoplastic resin injected into the cavity 13, and a rear end portion of the gas injection nozzle 20 is connected to a pressurized gas source 22 through a piping 21. In the mold assembly 10 shown in FIG. 15, the top end portion of the gas injection nozzle 20 is disposed in the cavity 13 when the molten thermoplastic resin is introduced into the cavity 13. The gas injection nozzle 20 is movable in the direction in which it enters into the cavity 13 and leaves the cavity 13 by means of a moving mechanism (for example, a hydraulic cylinder (not shown)).

Figure 4A:
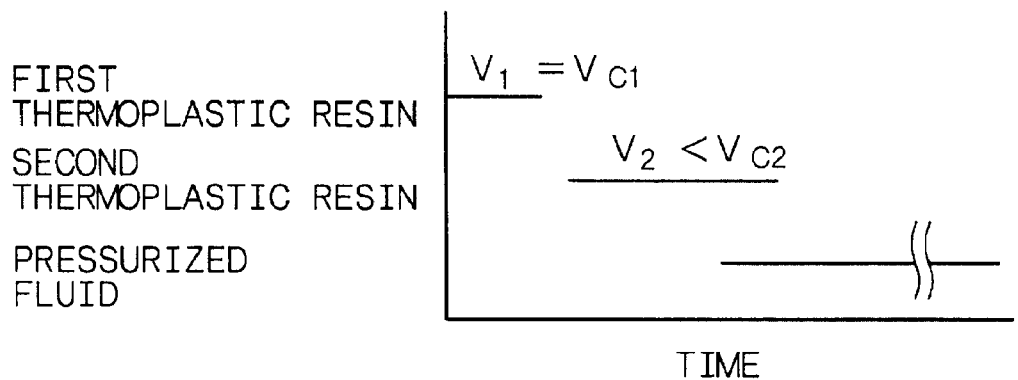
FIGS. 4A, 4B and 4C show timings of the start and completion of an injection of a first molten thermoplastic resin and a second molten thermoplastic resin, and the start of an introduction of a pressurized fluid in the first injection-molding method of the present invention.
Figure 4B:
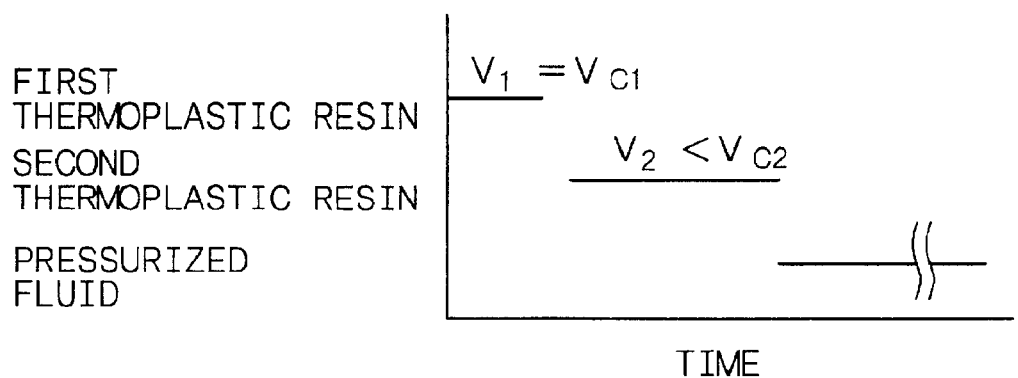
Figure 4C:
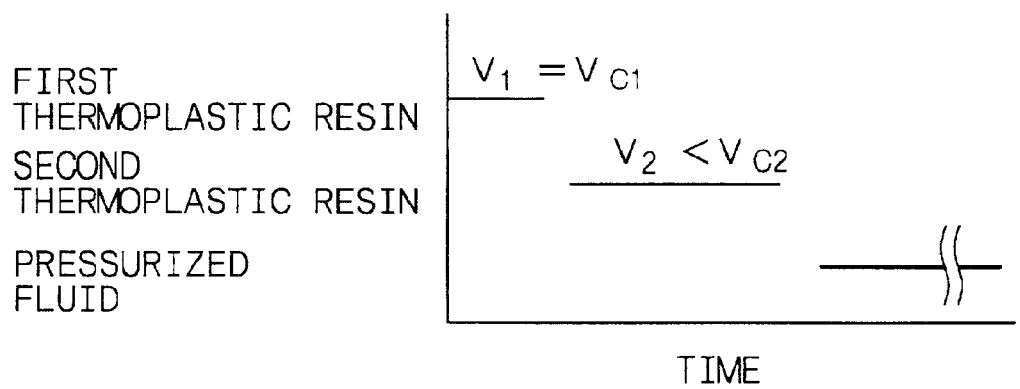
Figure 5A:
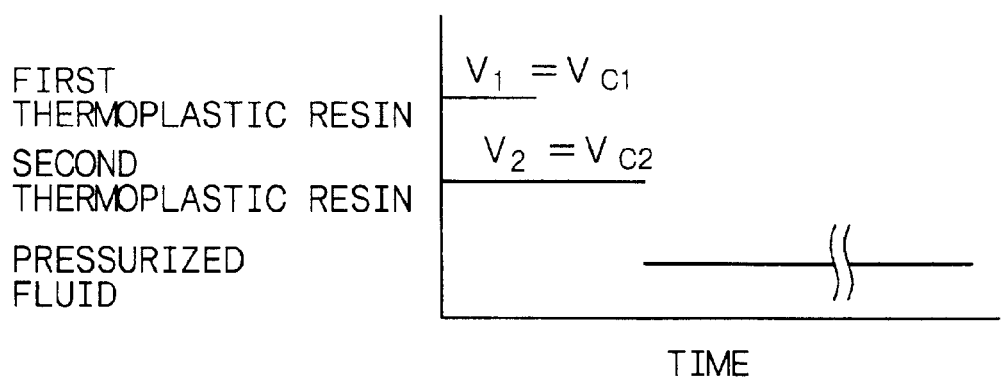
FIGS. 5A and 5B show timings of the start and completion of an injection of a first molten thermoplastic resin and a second molten thermoplastic resin, and the start of an introduction of a pressurized fluid in the first injection-molding method of the present invention.
Figure 5B:
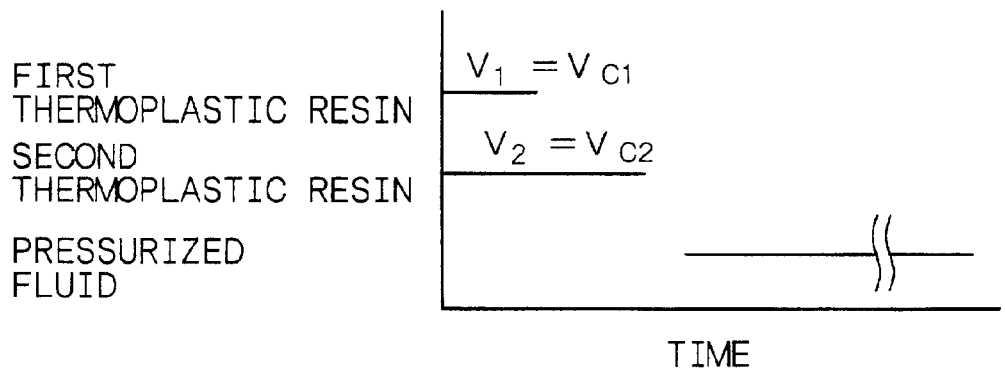
Figure 6A:
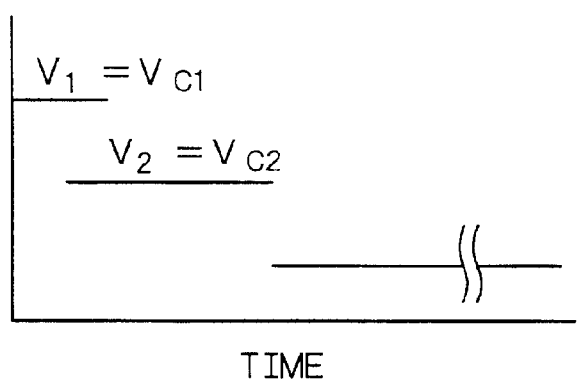
FIGS. 6A and 6B show timings of the start and completion of an injection of a first molten thermoplastic resin and a second molten thermoplastic resin, and the start of an introduction of a pressurized fluid in the first injection-molding method of the present invention.
Figure 6B:
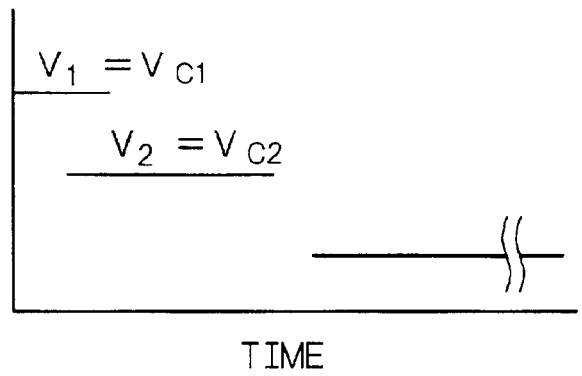
Figure 7A:
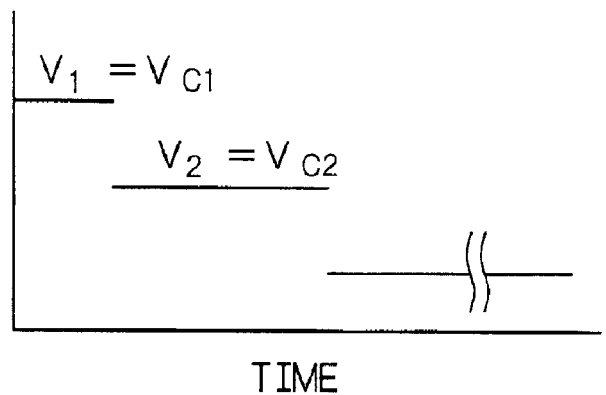
FIGS. 7A and 7B show timings of the start and completion of an injection of a first molten thermoplastic resin and a second molten thermoplastic resin, and the start of an introduction of a pressurized fluid in the first injection-molding method of the present invention.
Figure 7B:
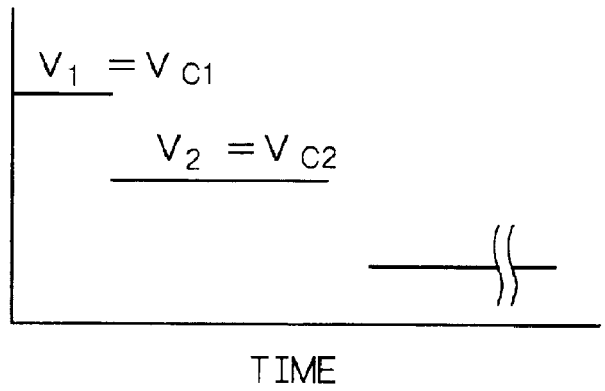
Figure 8A:
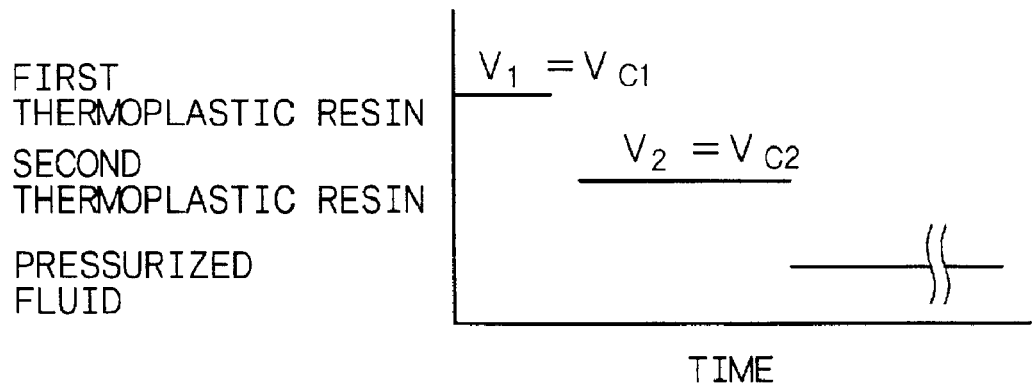
FIGS. 8A and 8B show timings of the start and completion of an injection of a first molten thermoplastic resin and a second molten thermoplastic resin, and the start of an introduction of a pressurized fluid in the first injection-molding method of the present invention.
Figure 8B:
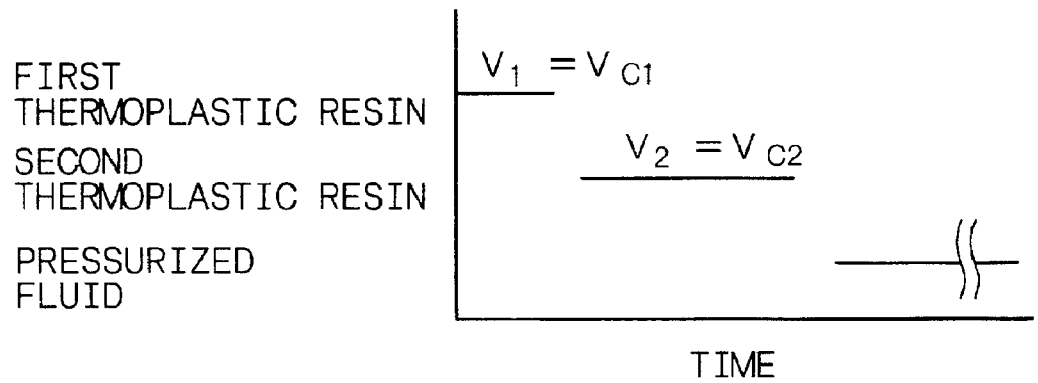
Figure 16:
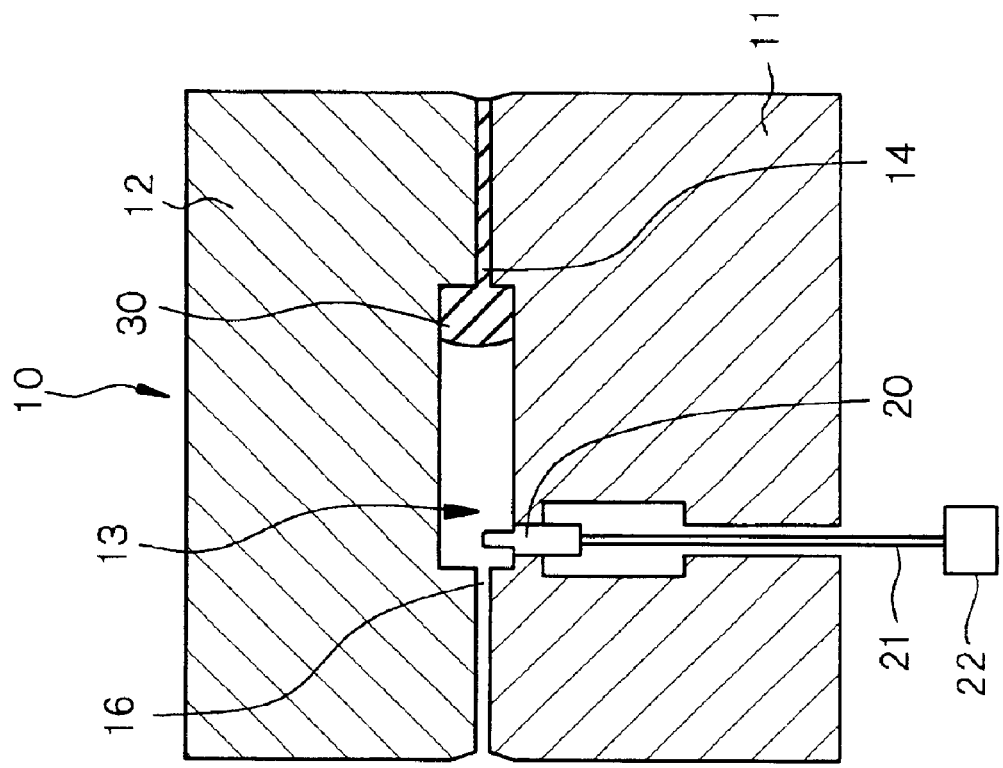
FIG. 16 is a conceptual view of the injection-molding apparatus, etc., for explaining the injection-molding method of Example 1.
Figure 17:
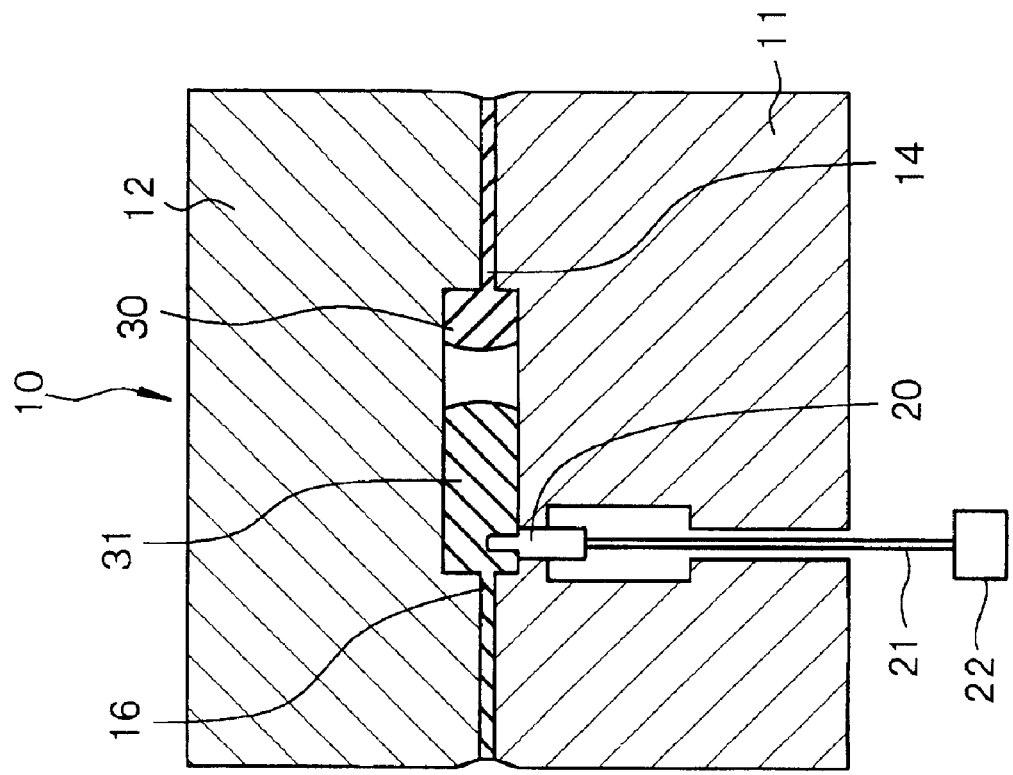
FIG. 17, following
Figure 18:
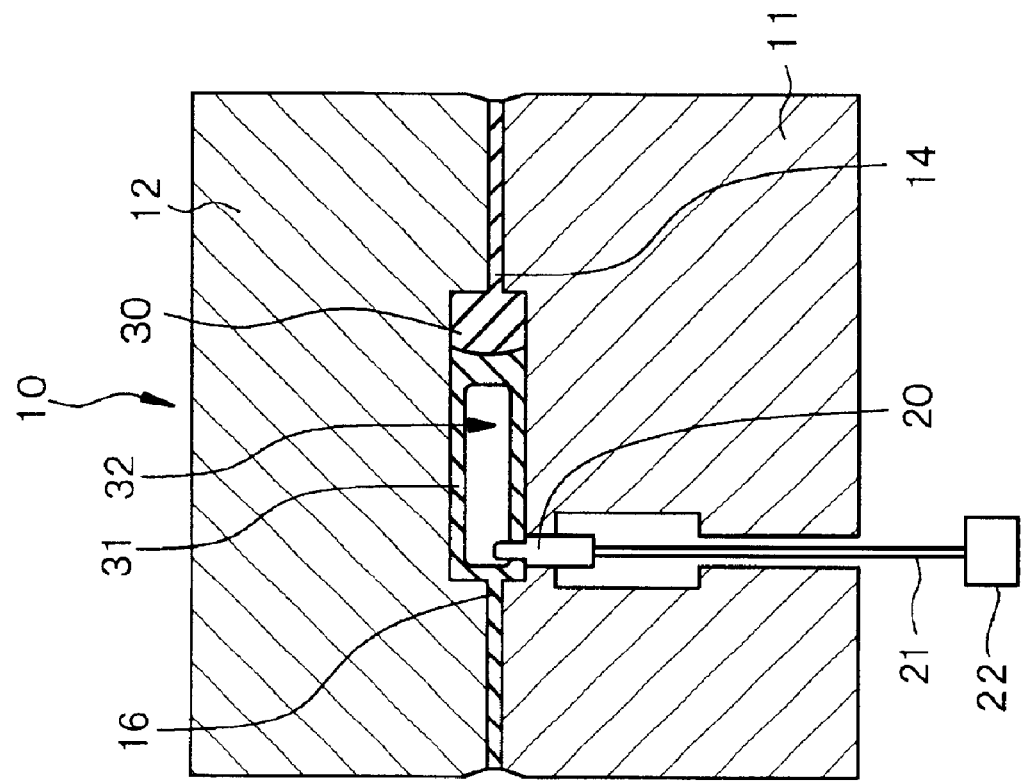
FIG. 18, following

The injection-molding method of Example 1 using the injection-molding apparatus shown in FIG. 15 will be explained with reference to conceptual views of the injection-molding apparatus shown in FIGS. 16 to 18. FIGS. 16 to 18 omit the illustration of the first and second injection cylinders 15 and 17. In the injection-molding method of Example 1, the embodiment shown in FIG. 4B was employed as timings of the start and completion of an injection of the first molten thermoplastic resin and the second molten thermoplastic resin, and the start of an introduction of the pressurized fluid. The cavity 13 had the form of a 30×30×120 mm rectangular parallelepiped. A polycarbonate resin (S3000, supplied by Mitsubishi Engineering-Plastics Corp.) was used as a first thermoplastic resin, and a glass-fiber-reinforced polycarbonate resin (GS-2010M, supplied by Mitsubishi Engineering-Plastics Corp.) was used as a second thermoplastic resin.

[Step-100]

As shown in FIG. 15, the fixed mold member 11 and the movable mold member 12 were clamped, and the gas injection nozzle 20 was brought into a state where the top end portion thereof was projected in the cavity 13. And, the first thermoplastic resin was plasticized, melted and metered in the first injection cylinder 15, and then, the first molten thermoplastic resin 30 was injected into the cavity 13 from the first injection cylinder 15 through the first-molten-resin injection portion 14 (see FIG. 16). The first molten thermoplastic resin 30 injected into the cavity 13 was adjusted to have a volume ($V_1$) that was 30% of the entire volume ($V_c$) of the cavity 13. Table 1 shows an injection condition of the first molten thermoplastic resin. The resin temperature is a temperature of the molten thermoplastic resin in the injection cylinder, and all of the pressure data are gage pressures.

TABLE 1

| | |
|---|---|
| Resin temperature | 280° C. |
| Injection pressure | 7.85 × 10$^7$ Pa (800 kgf/cm$^2$ – G) |
| Injection time period | 4 seconds |
| Mold temperature | 80° C. |

[Step-110]

The second thermoplastic resin was plasticized, melted and metered in the second injection cylinder 17 in advance. Three seconds after the injection of the first molten thermoplastic resin 30 into the cavity 13 was completed, the injection of the second molten thermoplastic resin 31 into the cavity 13 from the second injection cylinder 17 through the second-molten-resin injection portion 16 was started without bringing it into contact with the first molten thermoplastic resin 30 injected in the cavity 13. The second molten thermoplastic resin 31 was adjusted to have a volume ($V_2$) that was 50% of the entire volume ($V_c$) of the cavity 13. FIG. 17 shows a state after completion of the injection. Table 2 shows an injection condition of the second molten thermoplastic resin.

TABLE 2

| Resin temperature | 290° C. |
|---|---|
| Injection pressure | $7.85 \times 10^7$ Pa (800 kgf/cm$^2$ – G) |
| Injection time period | 6 seconds |
| Mold temperature | 80° C. |

[Step-120]

Concurrently with completion of the injection of the second molten thermoplastic resin 31 into the cavity 13, a pressurized fluid (nitrogen gas: $1.18 \times 10^7$ Pa, 120 kgf/cm$^2$-G) was introduced into the second molten thermoplastic resin 31 in the cavity 13 from the pressurized-fluid introducing portion (gas injection nozzle 20)in order to form a hollow portion 32 inside the second thermoplastic resin 31. In this manner, the second molten thermoplastic resin 31 was brought into contact with the first thermoplastic resin 30 and the cavity 13 was filled with the first thermoplastic resin 30 and the second thermoplastic resin 31 (see FIG. 18).

[Step-130]

Ninety seconds after the start of injection of the first molten thermoplastic resin 30, the pressurized fluid in the hollow portion 32 was released into atmosphere through the gas injection nozzle 20. And, 100 seconds after the start of injection of the first molten thermoplastic resin 30, the fixed mold member 11 and the movable mold member 12 were opened, and a molded article was taken out.

In the obtained molded article, a portion made of the first thermoplastic resin had a nearly uniform length (length along an imaginary line connecting the first injection cylinder and the second injection cylinder), and the hollow portion 32 was reliably formed in a portion made of the second thermoplastic resin. The portion made of the first thermoplastic resin and the portion made of the second thermoplastic resin had a reliable junction.

EXAMPLE 2

Figure 1B:
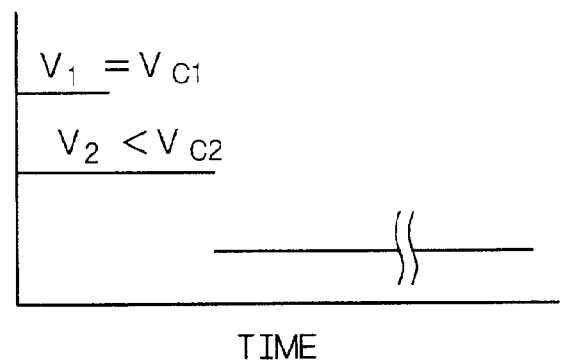
Figure 1C:
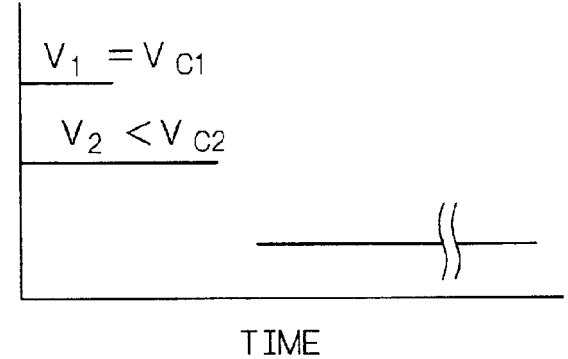
Figure 2A:
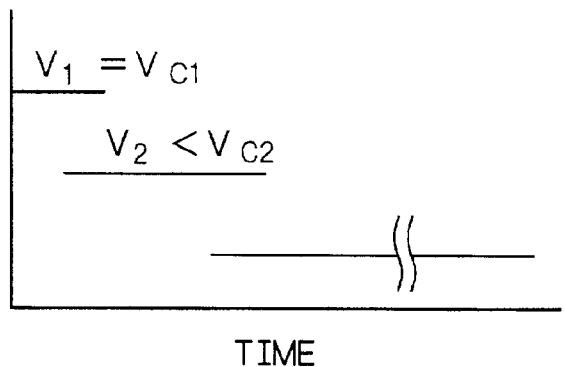
FIGS. 2A, 2B and 2C show timings of the start and completion of an injection of a first molten thermoplastic resin and a second molten thermoplastic resin, and the start of an introduction of a pressurized fluid in the first injection-molding method of the present invention.
Figure 2B:
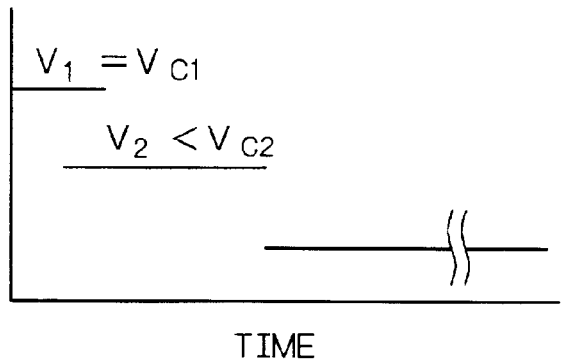
Figure 2C:
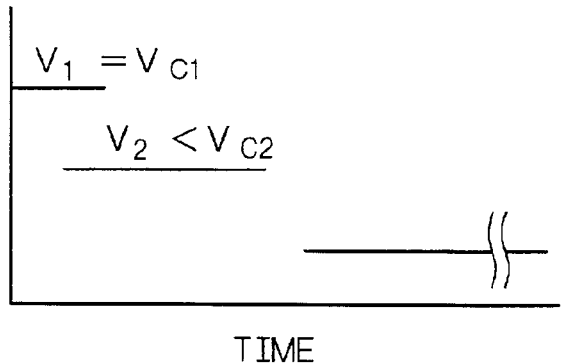
Figure 3A:
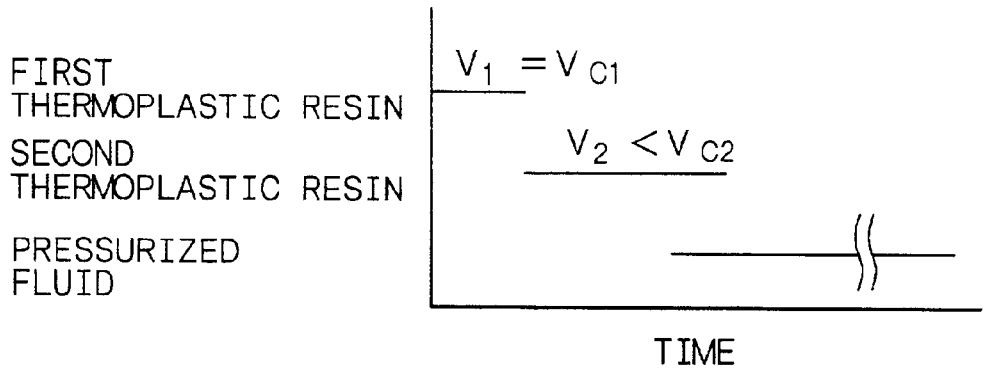
FIGS. 3A, 3B and 3C show timings of the start and completion of an injection of a first molten thermoplastic resin and a second molten thermoplastic resin, and the start of an introduction of a pressurized fluid in the first injection-molding method of the present invention.
Figure 3B:
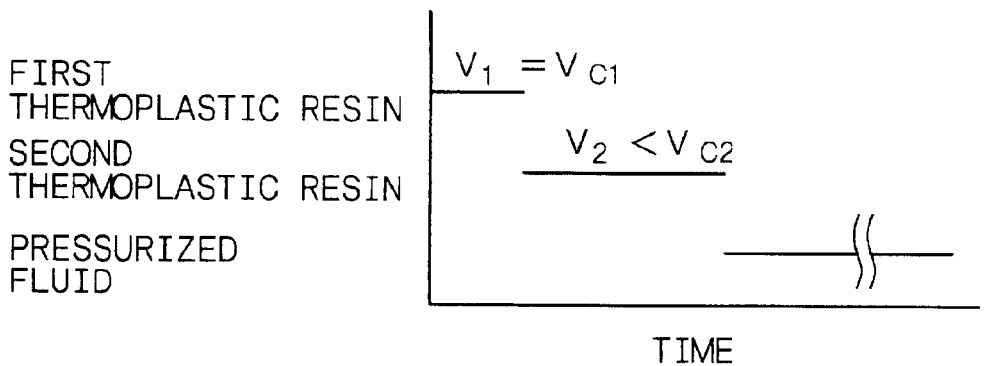
Figure 3C:
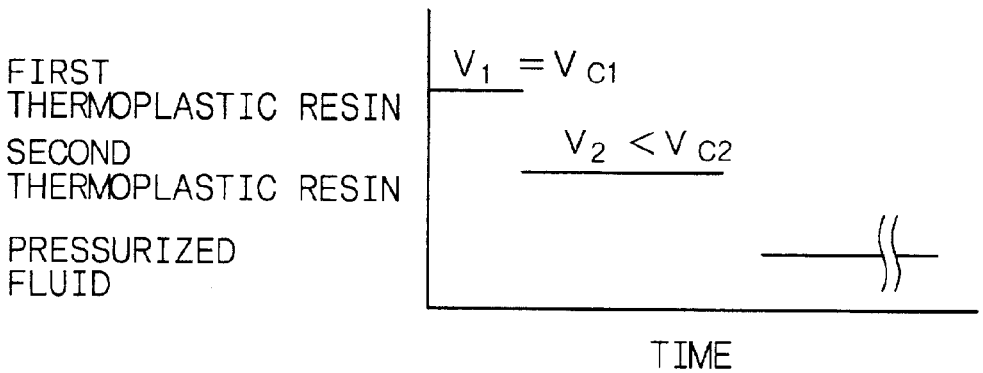

The injection-molding method of Example 2 is a variant of the injection-molding method of Example 1. In a step similar to [Step-120], the first thermoplastic resin was in a molten state when it came in contact with the second molten thermoplastic resin. In Example 2, the embodiment shown in FIG. 1B was employed as timings of the start and completion of an injection of the first molten thermoplastic resin and the second molten thermoplastic resin, and the start of an introduction of the pressurized fluid. Example 2 used the same injection-molding apparatus, the same first thermoplastic resin and the same second thermoplastic resin as those in Example 1.

[Step-200]

First, the first molten thermoplastic resin was injected into the cavity 13 from the first injection cylinder 15 through the first-molten-resin injection portion 14 in the same manner as in [Step-100] of Example 1. Concurrently with the start of injection of the first molten thermoplastic resin, the injection of the second molten thermoplastic resin into the cavity 13 from the second injection cylinder 17 through the second-molten-resin injection portion 16 was started without bringing it into contact with the first molten thermoplastic resin injected in the cavity 13 in the same manner as in [Step-110].

[Step-210]

And, concurrently with the completion of the injection of the second molten thermoplastic resin into the cavity 13, a pressurized fluid was introduced into the second molten thermoplastic resin in the cavity 13 from the pressurized-fluid introducing portion (gas injection nozzle 20) in the same manner as in [Step-120] of Example 1 in order to form a hollow portion inside the second thermoplastic resin. Due to the above procedure, the second molten thermoplastic resin was brought into contact with the first molten thermoplastic resin, and the cavity 13 was filled with the first molten thermoplastic resin and the second molten thermoplastic resin. Then, a step similar to [Step-130] of Example 1 was carried out in order to obtain a molded article.

The first thermoplastic resin was in a molten state when brought into contact with the second molten thermoplastic resin, so that a portion of the molded article made of the first thermoplastic resin and a portion of the molded article made of the second thermoplastic resin were melt-attached whereby the junction strength between these two portions was improved. In the thus-obtained molded article, the portions made of the first thermoplastic resin had a nearly uniform thickness, and the hollow portion was reliably formed in the portion made of the second thermoplastic resin.

EXAMPLE 3

Figure 19:
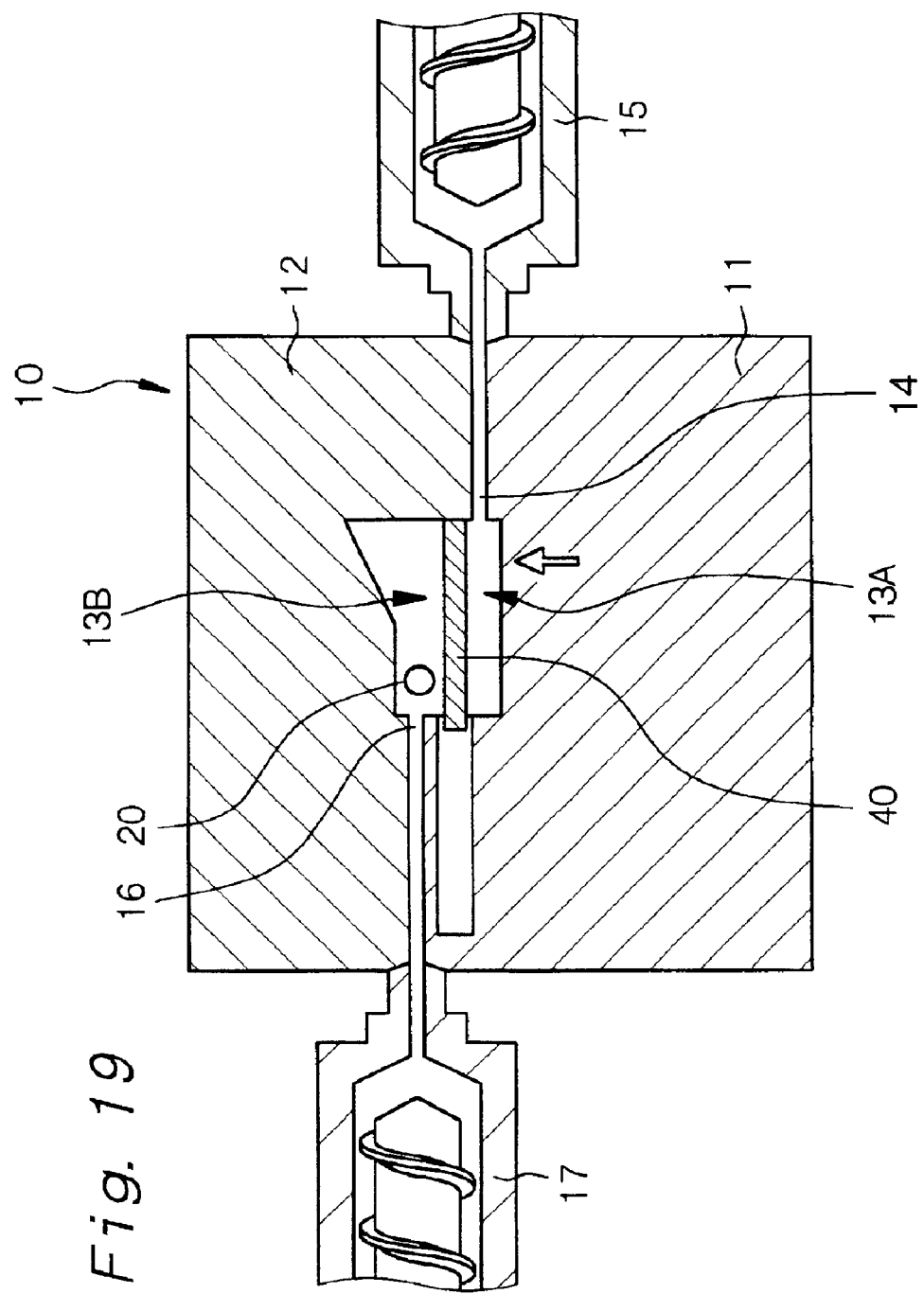
FIG. 19 is a conceptual view of an injection-molding apparatus of Example 3.

Example 3 is concerned with the injection-molding apparatus having a partition member, provided by the present invention, and the second injection-molding method of the present invention. FIG. 19 shows a conceptual view of the injection-molding apparatus of Example 3. The injection-molding apparatus is the same as the injection-molding apparatus explained in Example 1 except that it has a movable partition member 40 and that the cavity 13 has a different form, so that a detailed explanation of the common features is omitted.

The partition member 40 is disposed in a portion of the cavity between a first cavity portion 13A that the first molten thermoplastic resin can occupy in the cavity 13 and a second cavity portion 13B that the second thermoplastic resin can occupy in the cavity 13. In Example 3, the partition member 40 is movable in directions in which it comes near to the second injection cylinder 17 and comes near to the first injection cylinder 15 by means of a hydraulic cylinder (not shown). That is, the direction in which the partition member 40 is movable is nearly at right angles with the direction (indicated by a hollow arrow mark in FIG. 19) of a pressure exerted on the partition member 40 by the first molten thermoplastic resin injected into the first cavity portion 13A from the first-molten-resin injection portion 14. When the partition member 40 comes nearest to the first injection cylinder 15 (to be called "positioned in the forward end" hereinafter), the first cavity portion 13A and the second cavity portion 13B come out of a communicated state. Further, when the partition member 40 comes nearest to the second injection cylinder 17 (to be referred to as "positioned in the backward end" hereinafter), the entire partition member 40 is positioned outside the cavity 13. In Example 3, the surface of the partition member 40 which comes in contact with the first molten thermoplastic resin is formed as a flat surface. The gas injection nozzle 20 is movable in a direction perpendicular to the paper surface of the drawing.

Figure 9A:
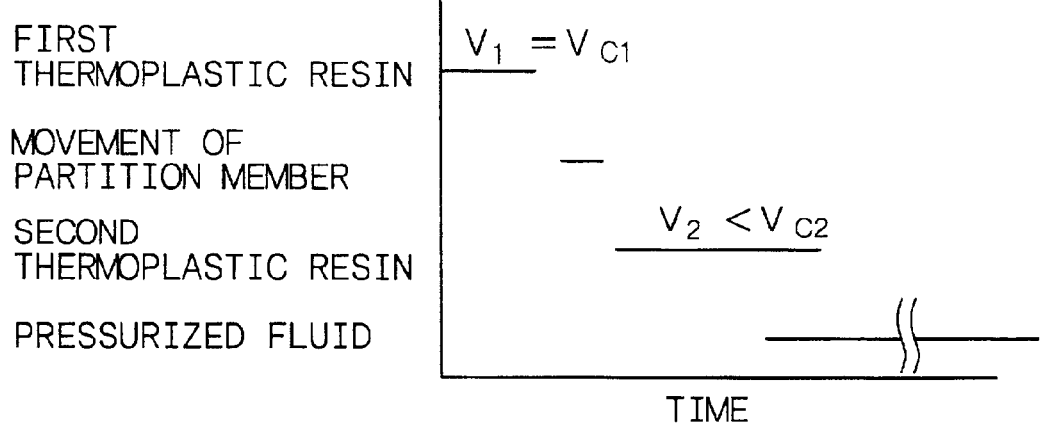
FIGS. 9A and 9B show timings of the start and completion of an injection of a first molten thermoplastic resin and a second molten thermoplastic resin, the start of an introduction of a pressurized fluid, and the movement of a partition member in the second injection-molding method of the present invention.
Figure 9B:
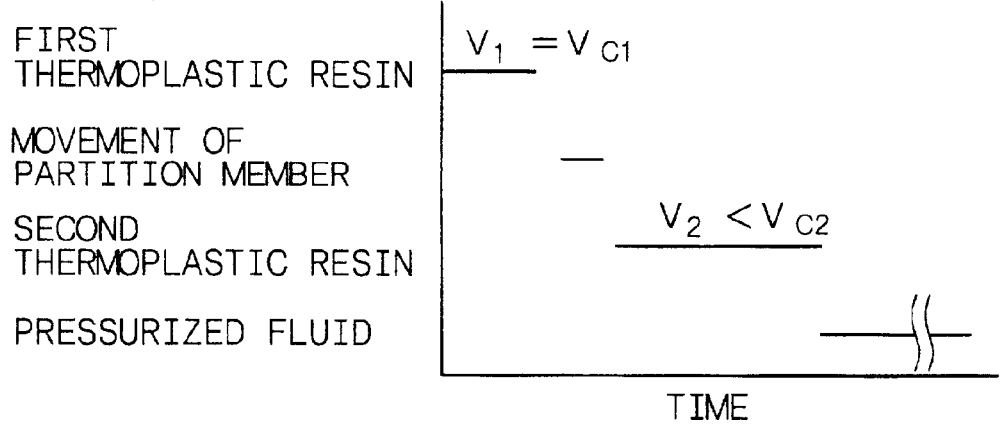
Figure 10A:
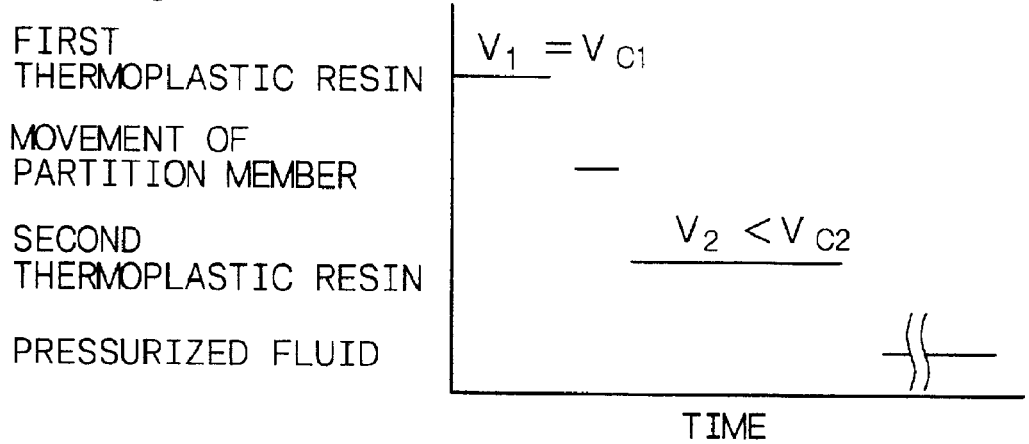
FIGS. 10A and 10B show timings of the start and completion of an injection of a first molten thermoplastic resin and a second molten thermoplastic resin, the start of an introduction of a pressurized fluid, and the movement of a partition member in the second injection-molding method of the present invention.
Figure 10B:
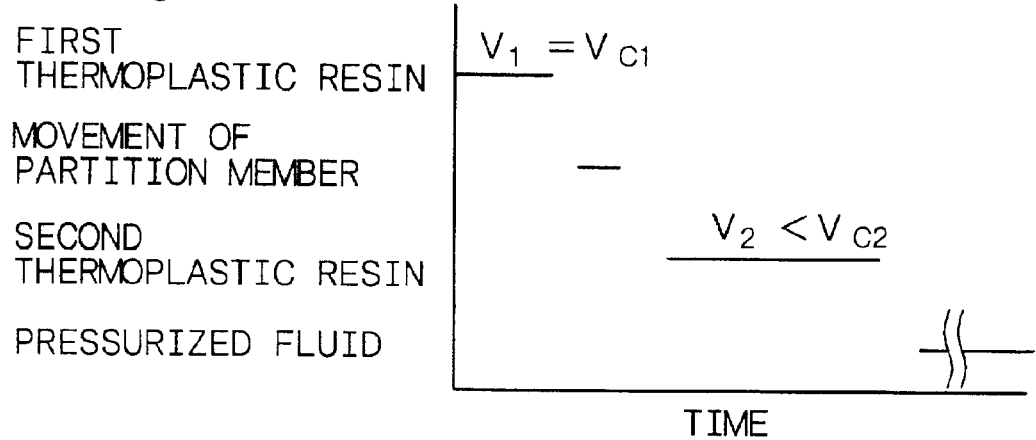
Figure 11A:
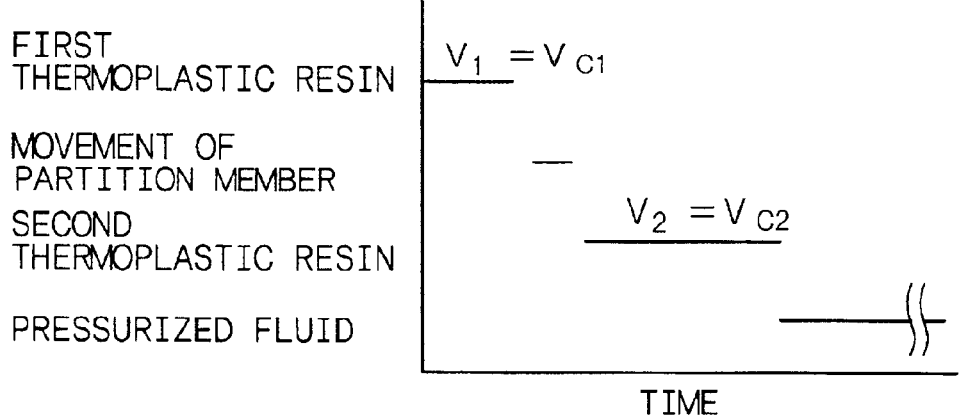
FIGS. 11A, 11B and 11C show timings of the start and completion of an injection of a first molten thermoplastic resin and a second molten thermoplastic resin, the start of an introduction of a pressurized fluid, and the movement of a partition member in the second injection-molding method of the present invention.
Figure 11B:
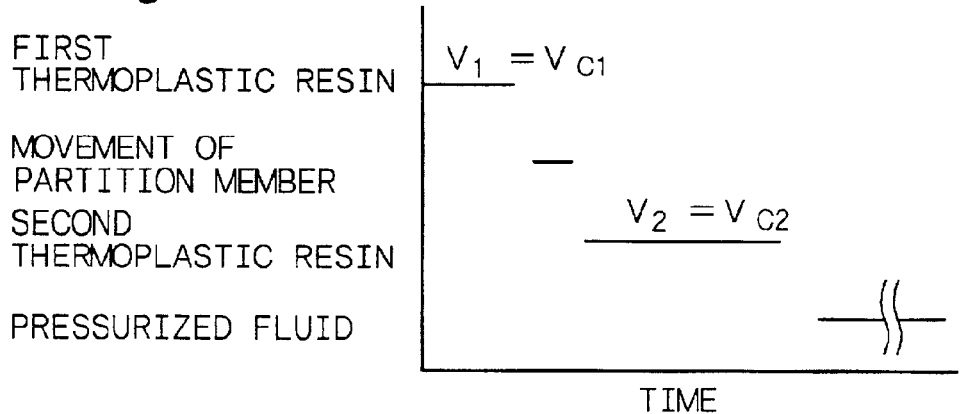
Figure 11C:
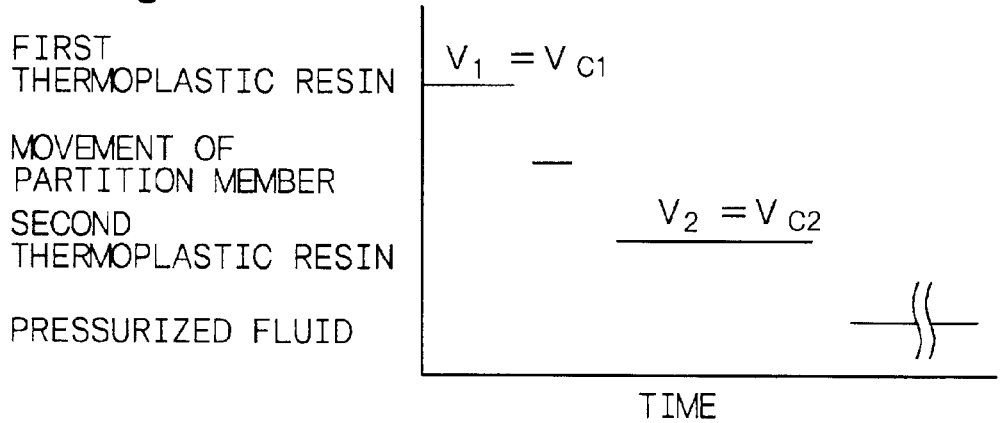

The injection-molding method of Example 3 using the injection-molding apparatus shown in FIG. 19 will be explained with reference to conceptual views of the injection-molding apparatus, etc., shown in FIGS. 20 to 23. FIGS. 20 to 23 omit the illustration of the first and second injection cylinders 15 and 17. In the injection-molding method of Example 3, the embodiment shown in FIG. 9B was employed as timings of the start and completion of an injection of the first molten thermoplastic resin and the second molten thermoplastic resin, the start of an introduction of the pressurized fluid, and the movement of the partition member 40. The cavity 13 had a size (i.e., a size of a molded article) as shown in FIG. 28. Example 3 used a polyacetal resin having excellent slidability (F20-03, supplied by Mitsubishi Engineering-Plastics Corp.) as a first thermoplastic resin and a polyacetal resin containing 25% by weight of a glass fiber (FG2025, supplied by Mitsubishi Engineering-Plastics Corp.) as a second thermoplastic resin. Examples 4 to 6, as explained in detail below, also used the above resins as a first thermoplastic resin and a second thermoplastic resin, and each of Examples 4 to 6 employed the same cavity size as that explained above.

[Step-300]

As shown in FIG. 19, a fixed mold member 11 and a movable mold member 12 were clamped, and a gas injection nozzle 20 was brought into a state where the top end portion thereof was projected in the cavity 13. And, the partition member 40 was disposed in the portion of the cavity between the first cavity portion 13A that the first molten thermoplastic resin could occupy in the cavity 13 and the second cavity portion 13B that the second molten thermoplastic resin could occupy in the cavity 13. That is, the partition member 40 was positioned in the forward end.

Figure 20:
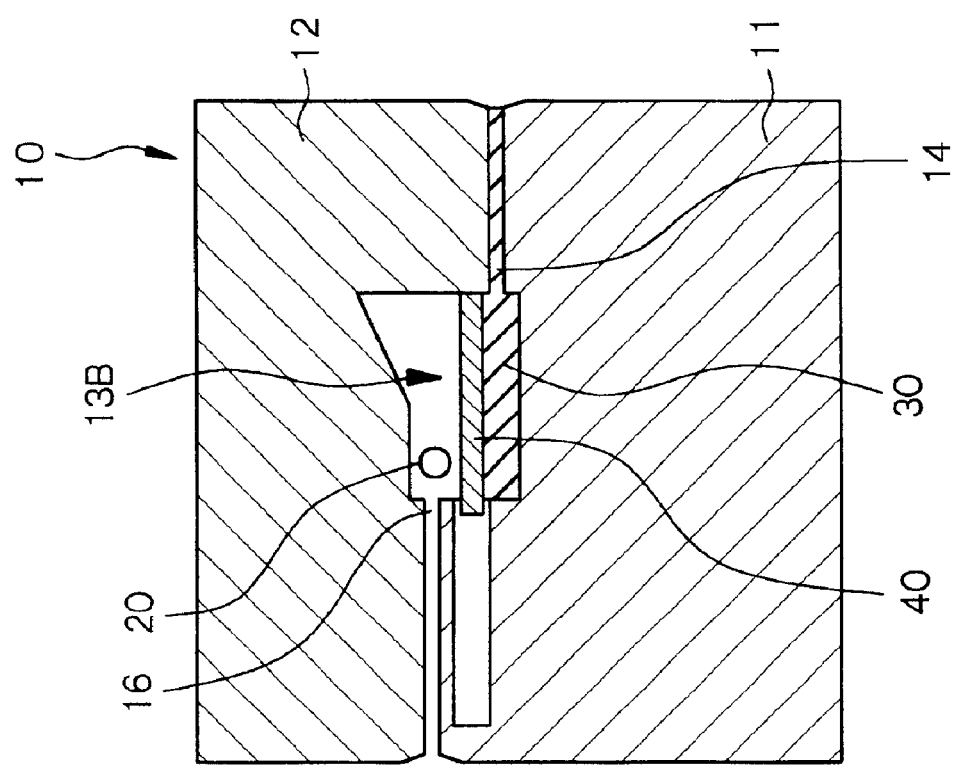
FIG. 20 is a conceptual view of the injection-molding apparatus, etc., for explaining an injection-molding method of Example 3.

Then, the first thermoplastic resin was plasticized, melted and metered in the first injection cylinder 15, and then the first molten thermoplastic resin 30 was injected into the first cavity portion 13A from the first injection cylinder 15 through the first-molten-resin injection portion 14 in order to fill the first cavity portion 13A with the first molten thermoplastic resin 30 (see FIG. 20). Table 3 shows an injection condition of the first molten thermoplastic resin. After completion of the injection of the first molten thermoplastic resin 30, a dwell time of 1 second under a pressure of $2.45 \times 10^7$ Pa (250 kgf/cm$^2$-G) was secured.

TABLE 3

| Resin temperature | 200° C. |
| --- | --- |
| Injection pressure | $5.89 \times 10^7$ Pa (600 kgf/cm$^2$ – G) |
| Injection time period | 3 seconds |
| Mold temperature | 60° C. |

[Step-310]

Figure 21:
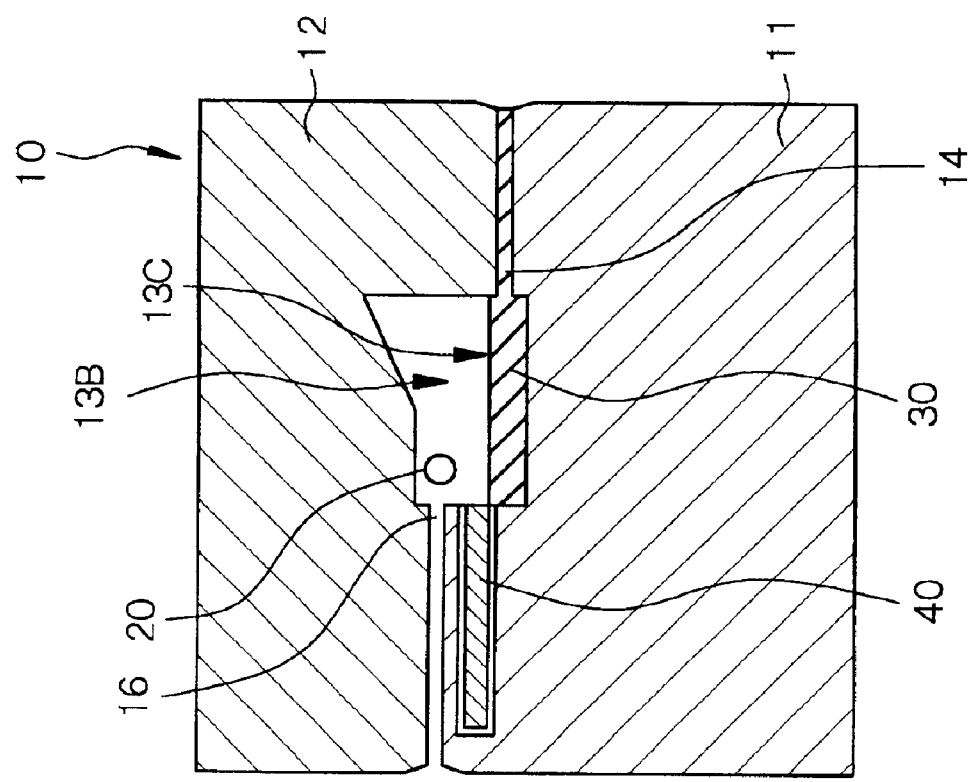
FIG. 21, following

Then, the partition member 40 was extracted or withdrawn from the cavity 13 by operating a hydraulic cylinder (not shown) to position the partition member 40 in the backward end (see FIG. 21).

[Step-320]

Figure 22:
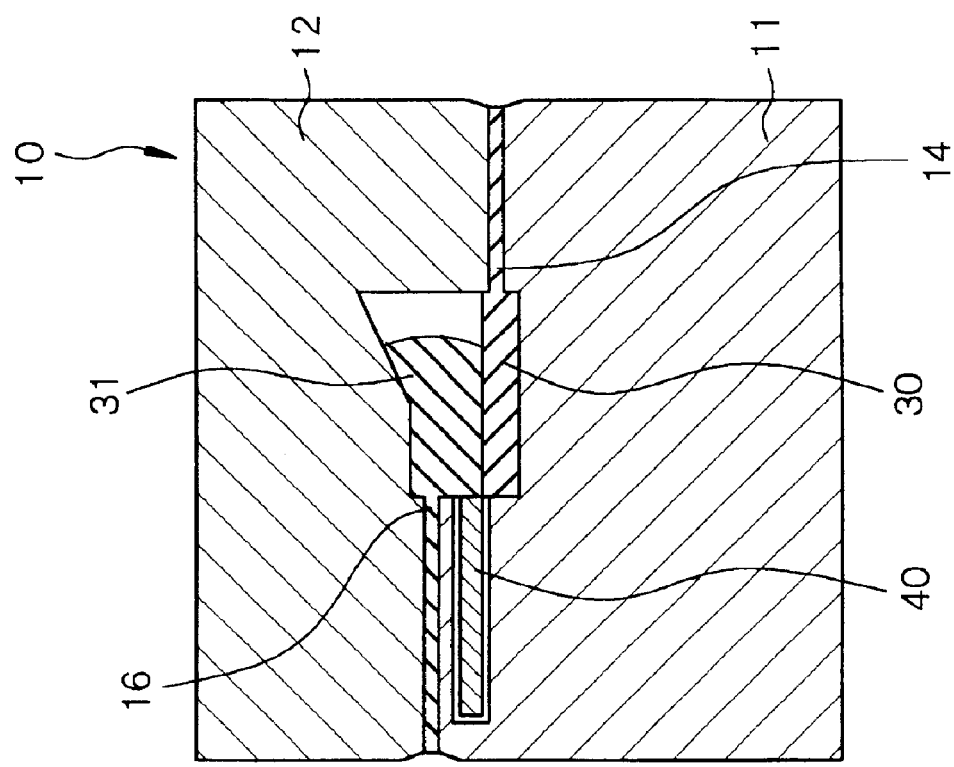
FIG. 22, following
Figure 23:
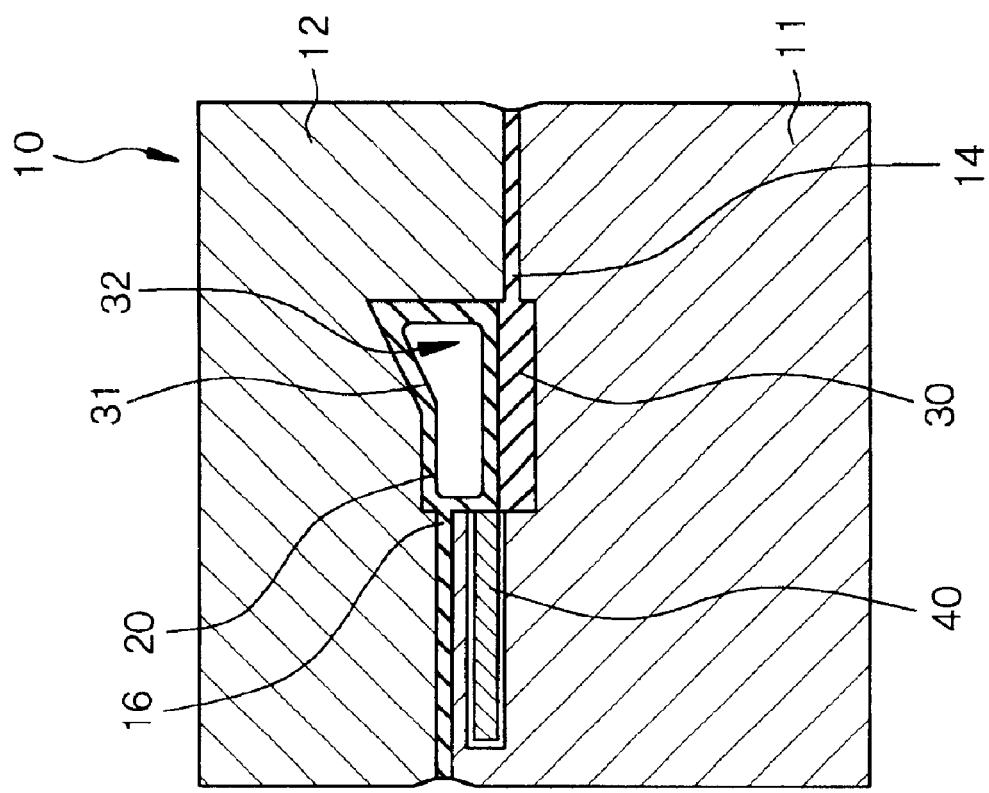
FIG. 23, following

The second thermoplastic resin was plasticized, melted and metered in the second injection cylinder 17 in advance. Then, the second molten thermoplastic resin 31 was injected into the portion 13C of the cavity (see FIG. 21) that had been occupied by the partition member 40 and the second cavity portion 13B from the second injection cylinder 17 through the second-molten-resin injection portion 16. The second molten thermoplastic resin 31 injected into the cavity 13 had a volume ($V_2$) that was adjusted to 70% of a total ($V_{c2}+V_p$) of the second cavity portion 13B and the portion 13C of the cavity that the partition member 40 had occupied. FIG. 22 shows a state immediately after completion of the injection.

Table 4 shows an injection condition of the second molten thermoplastic resin.

TABLE 4

| Resin temperature | 210° C. |
| --- | --- |
| Injection pressure | $6.87 \times 10^7$ Pa (700 kgf/cm$^2$ – G) |
| Injection time period | 6 seconds |
| Mold temperature | 60° C. |

[Step-330]

Concurrently with completion of the injection of the second molten thermoplastic resin 31 into the cavity 13, a pressurized fluid (nitrogen gas: $4.9 \times 10^6$ Pa, 50 kgf/cm$^2$-G) was introduced into the second molten thermoplastic resin 31 in the cavity 13 from the pressurized-fluid introducing portion (gas injection nozzle 20), to form a hollow portion 32 inside the second thermoplastic resin (see FIG. 23).

[Step-340]

Sixty seconds after the injection of the first molten thermoplastic resin 30 was started, the pressurized fluid in the hollow portion 32 was released into the atmosphere through the gas injection nozzle 20. Eighty seconds after the injection of the first molten thermoplastic resin 30 was started, the fixed mold member 11 and the movable mold member 12 were opened, and a molded article was taken out.

In the thus-obtained molded article, the portion made of the first thermoplastic resin had a uniform thickness, and the hollow portion 32 was reliably formed in the portion made of the second thermoplastic resin. Further, the portion made of the first thermoplastic resin and the portion made of the second thermoplastic resin were reliably melt-attached to each other.

EXAMPLE 4

Figure 29A:
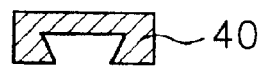
FIGS. 29A and 29D are schematic cross-sectional views of a partition member in a mold assembly of Examples 4 and 6.

Example 4 used an injection-molding apparatus that was the same as the injection-molding apparatus explained in Example 3 except that the surface of the partition member 40 which was to come in contact with the first molten thermoplastic resin was provided with a convexo-concave shape (undercut) as shown in FIG. 29A that is a schematic cross-sectional view obtained by cutting the partition member 40 with a plane at right angles with the longitudinal direction.

Figure 29B:
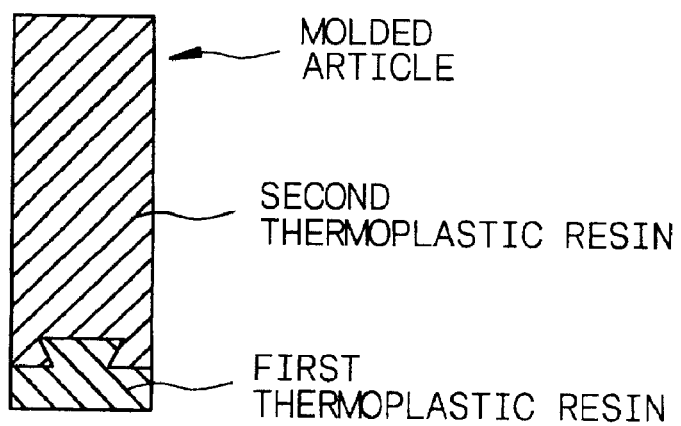
FIGS. 29B and 29C are schematic cross-sectional views of an obtained molded article.
Figure 29C:
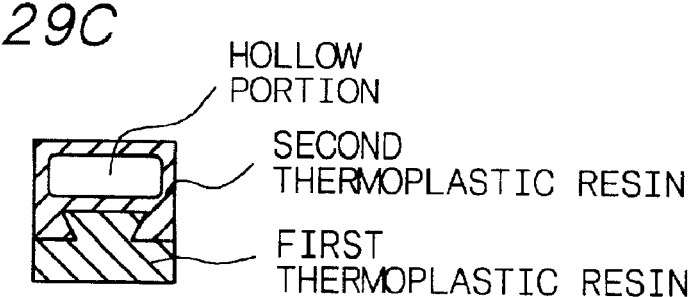

The injection-molding method of Example 4 is a variant of the injection-molding method of Example 3. The injection-molding method of Example 4 differs from that of Example 3 only in that a dwell time of 20 seconds under a pressure of $2.45 \times 10^7$ Pa (250 kgf/cm$^2$-G) was secured after completion of the injection of the first molten thermoplastic resin in a step similar to [Step-300]. By securing such a longer dwell time, the first thermoplastic resin in the first cavity portion 13A was cooled, and as a result, a portion of the first thermoplastic resin which came in contact with the second molten thermoplastic resin 31 was not brought into a re-melted state even if it came into contact with the second molten thermoplastic resin 31 in a step similar to [Step-320]. As shown in FIGS. 29B and 29C, which are schematic cross-sectional views of an obtained molded article, a portion of the molded article made of the first thermoplastic resin and a portion of the molded article made of the second thermoplastic resin were bonded to each other in an undercut state, and the junction strength between the portion of the molded article made of the first thermoplastic resin and the portion of the molded article made of the second thermoplastic resin was improved. FIG. 29B shows a schematic cross-sectional view taken along a line B—B in the cavity (mold article) shown in FIG. 28, and FIG. 29C shows a schematic cross-sectional view taken along a line C—C in the cavity (mold article) shown in FIG. 28.

EXAMPLE 5

Example 5 is concerned with the injection-molding apparatus having a partition member and the third injection-molding method of the present invention. Since the injection-molding apparatus of Example 5 has the same structure as the injection-molding apparatus of Example 3, so that a detailed explanation of common features is omitted. The direction in which the partition member 40 is movable is nearly at right angles with the direction of a pressure exerted on the partition member 40 by the second molten thermoplastic resin injected into the second cavity portion 13B from the second-molten-resin injection portion 16 or the direction of a pressure exerted on the partition member 40 by the pressurized fluid introduced from the pressurized-fluid introducing portion (gas injection nozzle 20) (the directions of these pressures are 180° reverse to the direction of the hollow arrow mark in FIG. 19).

Figure 12A:
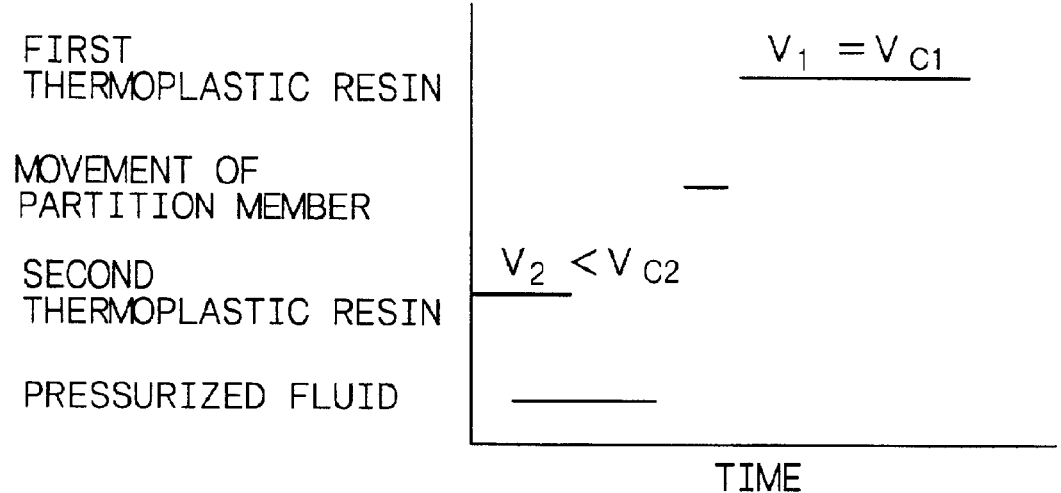
FIGS. 12A and 12B show timings of the start and completion of an injection of a first molten thermoplastic resin and a second molten thermoplastic resin, the start of an introduction of a pressurized fluid, and the movement of a partition member in the third injection-molding method of the present invention.
Figure 12B:
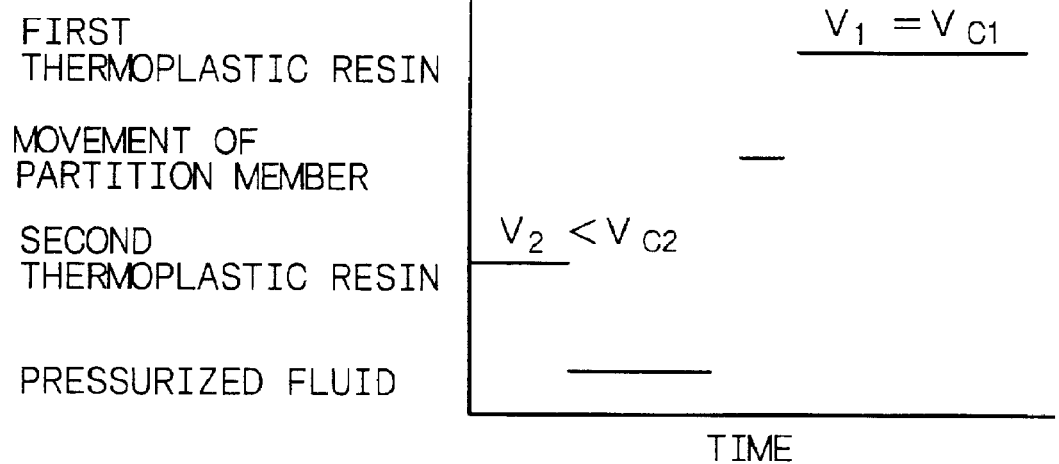
Figure 13A:
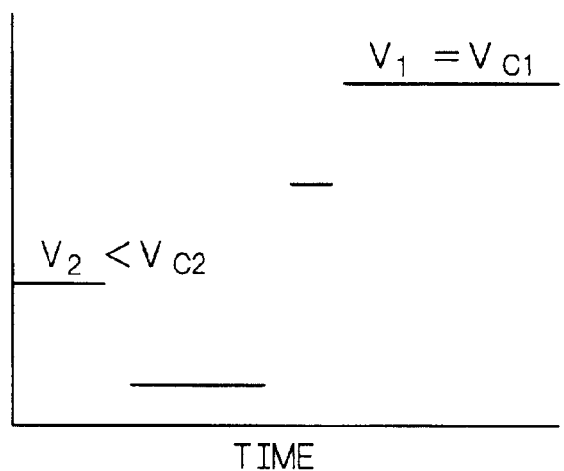
FIGS. 13A and 13B show timings of the start and completion of an injection of a first molten thermoplastic resin and a second molten thermoplastic resin, the start of an introduction of a pressurized fluid, and the movement of a partition member in the third injection-molding method of the present invention.
Figure 13B:
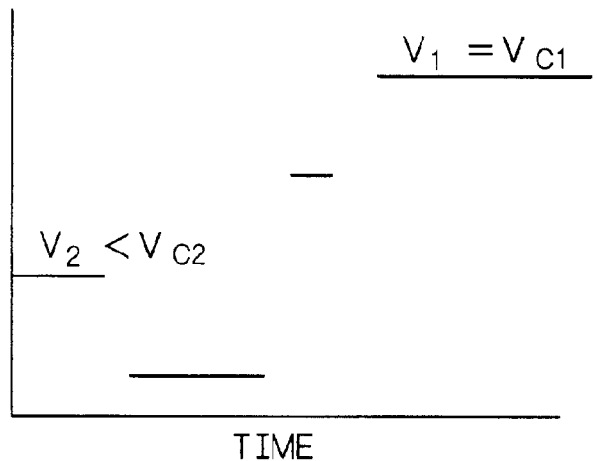
Figure 14A:
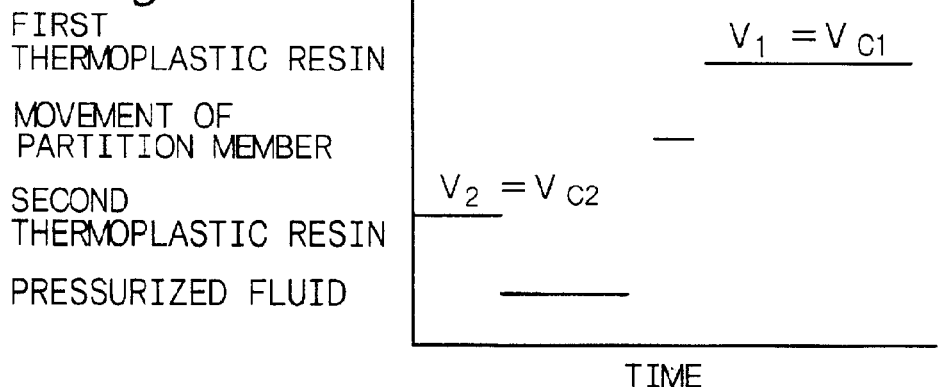
FIGS. 14A, 14B and 14C show timings of the start and completion of an injection of a first molten thermoplastic resin and a second molten thermoplastic resin, the start of an introduction of a pressurized fluid, and the movement of a partition member in the third injection-molding method of the present invention.
Figure 14B:
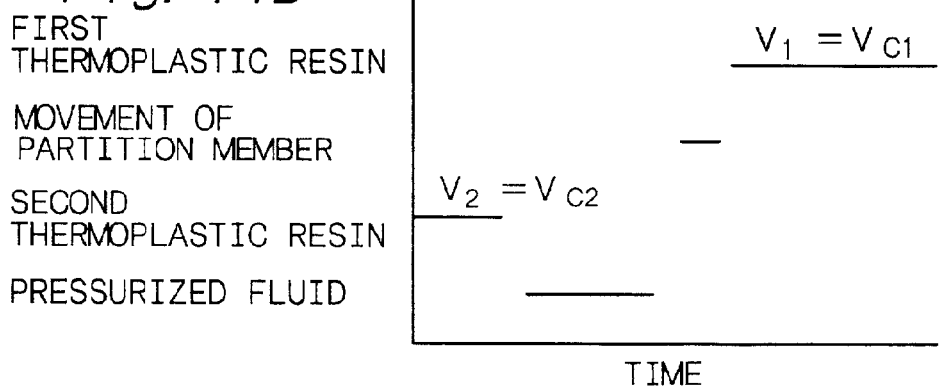
Figure 14C:
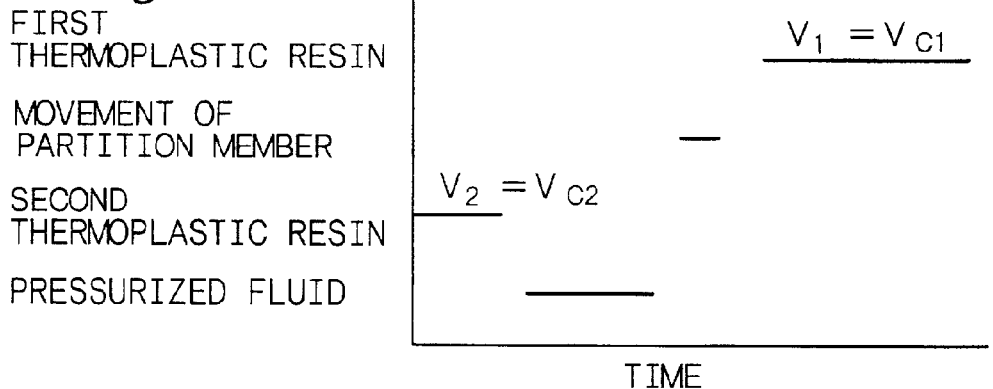

The injection-molding method of Example 5 using the injection-molding apparatus shown in FIG. 19 will be explained with reference to conceptual views of the injection-molding apparatus, etc., shown in FIGS. 24 to 27. FIGS. 24 to 27 omit showing of the first and second injection cylinders 15 and 17. In the injection-molding method of Example 5, the embodiment shown in FIG. 12B was employed as timings of the start and completion of an injection of the first molten thermoplastic resin and the second molten thermoplastic resin, the start of an introduction of the pressurized fluid, and the movement of the partition member 40.

[Step-500]

As shown in FIG. 19, the fixed mold member 11 and the movable mold member 12 were clamped, and the gas injection nozzle 20 was brought into a state where the top end portion thereof was projected in the cavity 13. And, the partition member 40 was disposed in the portion of the cavity between the first cavity portion 13A that the first molten thermoplastic resin could occupy in the cavity 13 and the second cavity portion 13B that the second molten thermoplastic resin could occupy in the cavity 13. That is, the partition member 40 was positioned in the forward end.

Figure 24:
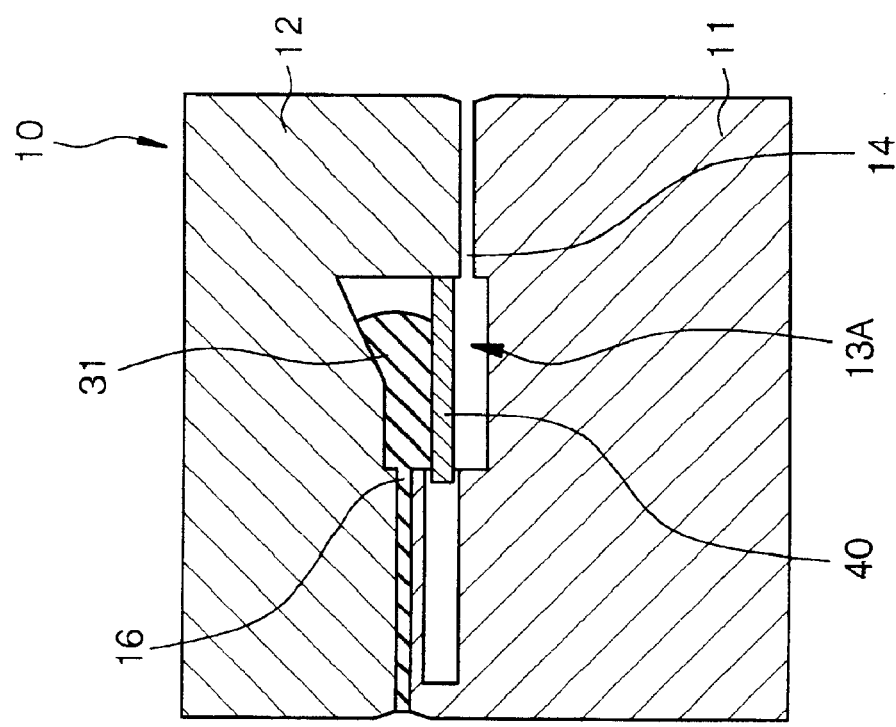
FIG. 24 is a conceptual view of an injection-molding apparatus, etc., for explaining an injection-molding method of Example 5.

Then, the second thermoplastic resin was plasticized, melted and metered in the second injection cylinder 17, and then the second molten thermoplastic resin 31 was injected into the second cavity portion 13A from the second injection cylinder 17 through the second-molten-resin injection portion 16 (see FIG. 24). The second molten thermoplastic resin 31 injected into the second cavity portion 13B had a volume ($V_2$) that was adjusted to 70% of the volume ($V_{c2}$) of the second cavity portion 13B. Table 5 shows an injection condition of the second molten thermoplastic resin.

TABLE 5

| Resin temperature | 210° C. |
| --- | --- |
| Injection pressure | 6.87 × 10$^7$ Pa (700 kgf/cm$^2$ – G) |
| Injection time period | 6 seconds |
| Mold temperature | 60° C. |

[Step-510]

Figure 25:
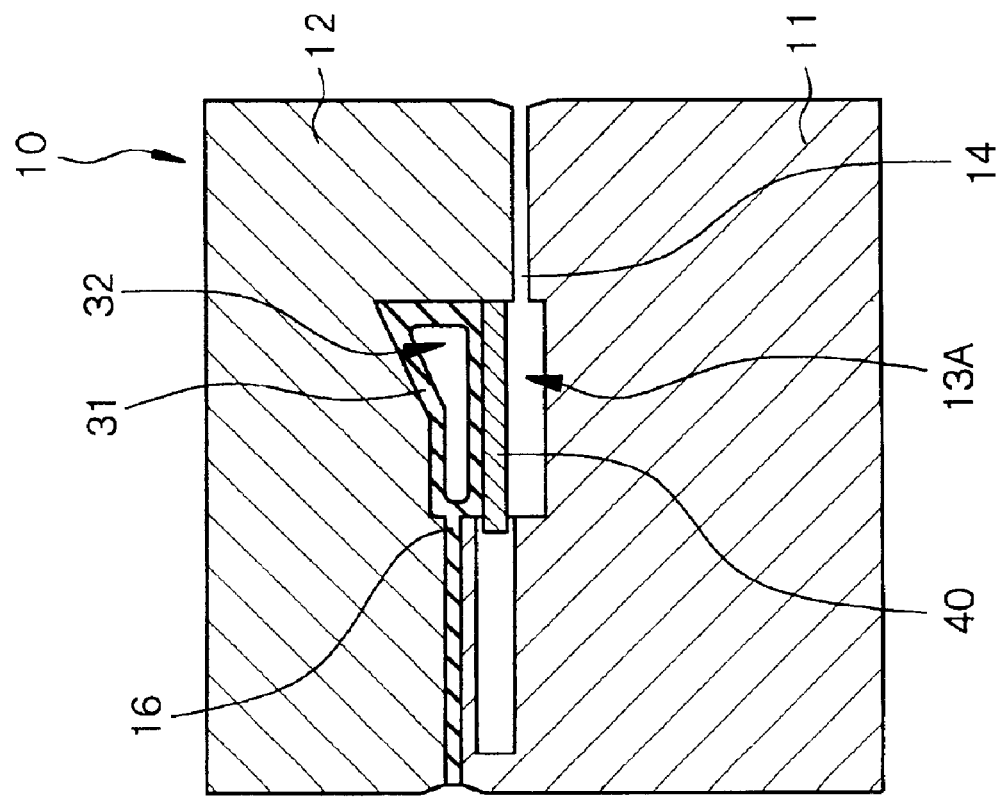
FIG. 25, following

Concurrently with completion of the injection of the second molten thermoplastic resin 31 into the cavity, a pressurized fluid (nitrogen gas: 4.9×10$^6$ Pa, 50 kgf/cm$^2$-G) was introduced into the second molten thermo plastic resin 31 in the second cavity portion 13B from the pressurized-fluid introducing portion (gas injection nozzle 20), to form a hollow portion 32 inside the second thermoplastic resin 31, and the second cavity portion 13B was filled with the second molten thermoplastic resin 31 (see FIG. 25). Sixty seconds after the injection of the second molten thermoplastic resin 31 was started, the pressurized fluid in the hollow portion 32 was released into the atmosphere through the gas injection nozzle 20.

[Step-520]

Figure 26:
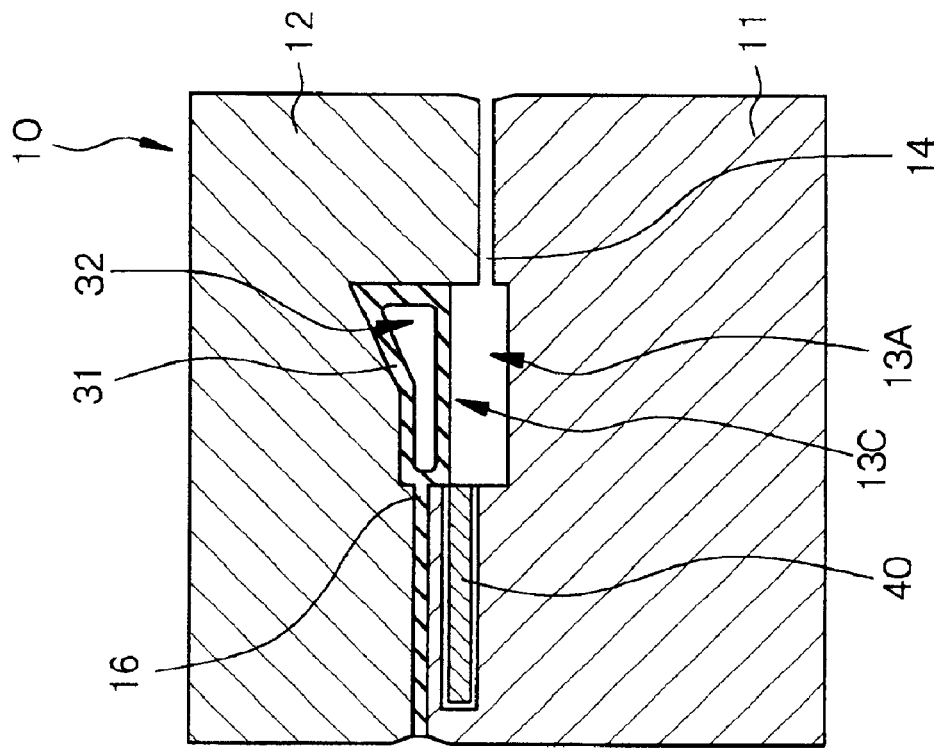
FIG. 26, following
Figure 27:
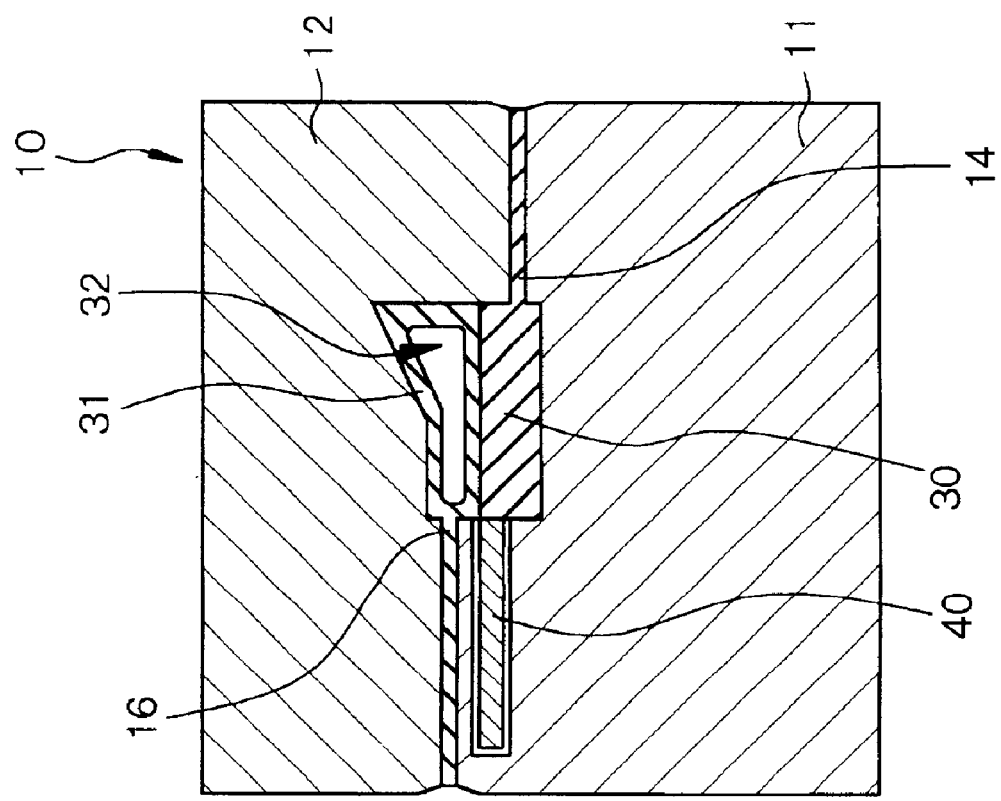
FIG. 27, following

Then, the partition member 40 was extracted or withdrawn by operating a hydraulic cylinder (not shown) and then positioned in the backward end (see FIG. 26).

[Step-530]

The first thermoplastic resin was plasticized, melted and metered in the first injection cylinder 15 in advance. Then, the first molten thermoplastic resin 30 was injected into the portion 13C of the cavity (see FIG. 26) that had been occupied by the partition member 40 and the first cavity portion 13A from the first injection cylinder 15 through the first-molten-resin injection portion 14, to fill the portion 13C of the cavity occupied by the partition member 40 and the first cavity portion 13A with the first molten thermoplastic resin 30 (see FIG. 27). Table 6 shows an injection condition of the first molten thermoplastic resin. After completion of the injection of the first molten thermoplastic resin 30, a dwell time of 20 seconds was secured under a pressure of 2.45×10$^7$ Pa (250 kgf/cm$^2$-G).

TABLE 6

| Resin temperature | 200° C. |
| --- | --- |
| Injection pressure | 5.89 × 10$^7$ Pa (600 kgf/cm$^2$ – G) |
| Injection time period | 3 seconds |
| Mold temperature | 60° C. |

Seventy seconds after the injection of the second molten thermoplastic resin 31 was started, the fixed mold member 11 and the movable mold member 12 were opened, and a molded article was taken out.

In the thus-obtained molded article, the portion made of the first thermoplastic resin had a uniform thickness, and the hollow portion 32 was reliably formed in the portion made of the second thermoplastic resin. Further, the portion made of the first thermoplastic resin and the portion made of the second thermoplastic resin were reliably melt-attached to each other.

EXAMPLE 6

Figure 29D:

Example 6 used an injection-molding apparatus that was the same as the injection-molding apparatus explained in Example 3 except that the surface of the partition member 40 which was to come in contact with the second molten thermoplastic resin was provided with a convexo-concave shape (undercut) as shown in FIG. 29D which is a schematic cross-sectional view obtained by cutting the partition member 40 with a plane at right angles with the longitudinal direction.

The injection-molding method of Example 6 is a variant of the injection-molding method of Example 5. In a step similar to [Step-510], concurrently with completion of the injection of the second molten thermoplastic resin into the second cavity portion 13B, a pressurized fluid (nitrogen gas: 4.9×10$^6$ Pa, 50 kgf/cm$^2$-G) was introduced into the second molten thermoplastic resin in the second cavity portion 13B from the pressurized-fluid introducing portion (gas injection nozzle 20), to form a hollow portion inside the second thermoplastic resin, and the second cavity portion 13B was filled with the second molten thermoplastic resin. And, unlike Example 5, 90 seconds after the injection of the second molten thermoplastic resin was started, the pressurized fluid in the hollow portion was released into the atmosphere through the gas injection nozzle 20.

By taking such a longer time before the injection of the first molten thermoplastic resin into the first cavity portion 13A than in Example 5, the second thermoplastic resin in the second cavity portion 13B was cooled, and as a result, a portion of the second thermoplastic resin which came in contact with the first molten thermoplastic resin was not brought into a re-melted state even if it came into contact with the first molten thermoplastic resin in a step similar to (Step-530). In the obtained molded article, however, the portion of the molded article made of the first thermoplastic resin and the portion of the molded article made of the second thermoplastic resin were bonded to each other in an undercut state as shown in the schematic cross-sectional view of FIG. 29B (provided that the direction of the undercut is reverse), so that the junction strength between the portion of the molded article made of the first thermoplastic resin and the portion of the molded article made of the second thermoplastic resin was improved.

COMPARATIVE EXAMPLE

The comparative Example used a mold assembly 100 of which the conceptual view is shown in FIG. 30. Specifically, the mold assembly 100 used in Comparative Example differs from the mold assembly of Example 3 shown in FIG. 19 in that the first and second molten thermoplastic resins from a first injection cylinder 115 and a second injection cylinder 117 are injected into the cavity 13 through one molten-resin-injection portion 114 and that no partition member is provided.

The first thermoplastic resin was plasticized, melted and metered in the first injection cylinder 115, and then injected into the cavity 13 from the first injection cylinder 115 through the molten-rein-injection portion 114. Table 7 shows an injection condition of the first molten thermoplastic resin. The injection amount of the first molten thermoplastic resin was adjusted to be an amount equal to 30% of the volume of the cavity 13.

TABLE 7

| Resin temperature | 200° C. |
|---|---|
| Injection pressure | 5.89 × $10^7$ Pa (600 kgf/cm$^2$ – G) |
| Injection time period | 3 seconds |
| Mold temperature | 60° C. |

The second thermoplastic resin was plasticized, melted and metered in the second injection cylinder 117 in advance. And, concurrently with completion of the injection of the first molten thermoplastic resin, the second molten thermoplastic resin was injected into the cavity 13 from the second injection cylinder 117 through the molten-resin-injection portion 114. The second molten thermoplastic resin injected into the cavity 13 had a volume equal to 40% of the volume of the cavity 13. Table 8 shows an injection condition of the second molten thermoplastic resin.

TABLE 8

| Resin temperature | 210° C. |
|---|---|
| Injection pressure | 6.87 × $10^7$ Pa (700 kgf/cm$^2$ – G) |
| Injection time period | 3 seconds |

TABLE 8-continued

| Mold temperature | 60° C. |
|---|---|

Concurrently with completion of the injection of the second molten thermoplastic resin into the cavity 13, a pressurized fluid (nitrogen gas: 4.9×$10^6$ Pa, 50 kgf/cm$^2$-G) was introduced into the molten thermoplastic resin in the cavity 13 from the pressurized-fluid introducing portion (gas injection nozzle 20), to form a hollow portion inside the thermoplastic resin. Sixty seconds after the injection of the first molten thermoplastic resin was started, the pressurized fluid in the hollow portion was released into the atmosphere through the gas injection nozzle 20. Eighty seconds after the injection of the first molten thermoplastic resin was started, the fixed mold member 11 and the movable mold member 12 were opened, and a molded article was taken out.

In the thus-obtained molded article, the portion made of the first thermoplastic resin had a non-uniform thickness, and a surface portion made of the first thermoplastic resin was formed on the molded article including a portion of the molded article that portion did not require any surface of the first thermoplastic resin.

The present invention has been explained with reference to preferred Examples hereinabove, while the present invention shall not be limited thereto. Structures of the mold assembly explained in Examples and the first and second thermoplastic resins and the injection molding conditions used in Examples are shown as examples and may be changed or altered as required. In the first injection-molding method of the present invention, the injection of the second molten thermoplastic resin may be carried out prior to the injection of the first molten thermoplastic resin in some cases. That is, in the first injection-molding method of the present invention, the embodiment of starting the injection of the second molten thermoplastic resin into the cavity concurrently with the injection of the first molten thermoplastic resin into the cavity includes an embodiment of carrying out the injection of the second molten thermoplastic resin prior to the injection of the first molten thermoplastic resin.

Further, the second injection-molding method of the present invention and the third injection-molding method of the present invention may be combined. That is, there may be employed an injection-molding method using, for example, a modified injection-molding apparatus similar to the injection-molding apparatus as explained in Example 3. This injection-molding method comprises the step (a) of disposing a movable partition member in a portion of the cavity between the first cavity portion in which the first molten thermoplastic resin can occupy in the cavity and the second cavity portion in which the second molten thermoplastic resin can occupy in the cavity. This injection-molding method then comprises the step (b) of injecting the first molten thermoplastic resin into the first cavity portion from the first injection cylinder through the first-molten-resin injection portion.

This injection-molding method also comprises the step (c) of introducing a first pressurized fluid into the first molten thermoplastic resin in the first cavity portion from a first pressurized-fluid introducing portion during the injection of the first molten thermoplastic resin into the first cavity portion or after completion of the injection thereof, thereby to form a hollow portion inside the first thermoplastic resin.

This injection-molding method also comprises the step (d) of extracting or withdrawing the partition member from the cavity.

This injection-molding method also comprises the step (d) of injecting the second molten thermoplastic resin into the portion of the cavity that the partition member had occupied and the second cavity portion from the second injection cylinder through the second-molten-resin injection portion. and This injection-molding method also comprises the step (d) of introducing a second pressurized fluid into the second molten thermoplastic resin in the cavity from a second pressurized-fluid introducing portion during the injection of the second molten thermoplastic resin or after completion of the injection thereof, thereby to form a hollow portion inside the second thermoplastic resin.

The above injection-molding method can include various embodiments in the second injection-molding method of the present invention and the third injection-molding method of the present invention.

In the present invention, desired portions of a molded article made of two thermoplastic resins can be reliably formed of the two thermoplastic resins, and the form or shape of each of the portions made of the thermoplastic resins can be accurately and easily controlled. Further, the junction strength between the portion of the molded article made of the first thermoplastic resin and the portion of the molded article made of the second thermoplastic resin can be improved. Accordingly, desired portions of a molded article can be reliably imparted with desired properties of the two thermoplastic resins having different properties, so that the freedom of design of molded articles can be improved, and that molded articles can be diversified.

What is claimed is:

1. A method for injection-molding a molded article having a hollow portion by means of an injection-molding apparatus, said apparatus comprising:
    a mold assembly having
        a first-molten-resin injection portion for injecting a first molten thermoplastic resin into a cavity of the mold assembly,
        a second-molten-resin injection portion for injecting a second molten thermoplastic resin into the cavity of the mold assembly, and
        a pressurized-fluid introducing portion for introducing a pressurized fluid into the second molten thermoplastic resin injected into the cavity;
    a first injection cylinder communicating with the first-molten-resin injection portion; and
    a second injection cylinder communicating with the second-molten-resin injection portion;
    said method comprising:
        injecting the first molten thermoplastic resin from the first injection cylinder into the cavity through the first-molten-resin injection portion;
        initiating injection of the second molten thermoplastic resin from the second injection cylinder into the cavity through the second-molten-resin injection portion, without bringing the second molten thermoplastic resin into contact with the first molten thermoplastic resin injected into the cavity, concurrently with the start of said injecting the first molten thermoplastic resin into the cavity, during said injecting the first molten thermoplastic resin into the cavity, or after completion of said injecting the first molten thermoplastic resin into the cavity; and
        introducing the pressurized fluid into the second molten thermoplastic resin in the cavity from the pressurized-fluid introducing portion during said injecting the second molten thermoplastic resin into the cavity or after completion of said injecting the second molten thermoplastic resin into the cavity thereby to form the hollow portion only inside the second molten thermoplastic resin, which hollow portion does not extend to the first molten thermoplastic resin, and to bring the second molten thermoplastic resin into contact with the first molten thermoplastic resin.

2. The method according to claim 1, wherein the first molten thermoplastic resin comes into contact with the second molten thermoplastic resin in said introducing the pressurized fluid into the second molten thermoplastic resin in the cavity, the first molten thermoplastic resin being in a molten state when the first molten thermoplastic resin comes into contact with the second thermoplastic resin.

3. The method according to claim 1, wherein a portion of the first molten thermoplastic resin comes in contact with the second molten thermoplastic resin in said introducing the pressurized fluid into the second molten thermoplastic resin in the cavity, the portion of the first molten thermoplastic resin coming into a re-melted state due to the contact thereof with the second molten thermoplastic resin.

4. The method according to claim 1, wherein the first molten thermoplastic resin comes in contact with the second molten thermoplastic resin after the start of said introducing the pressurized fluid into the second molten thermoplastic resin in the cavity.

5. The method according to claim 1, wherein the first molten thermoplastic resin comes in contact with the second molten thermoplastic resin on or around a time of completion of said injecting the second molten thermoplastic resin into the cavity.

6. The method according to claim 1, wherein the first thermoplastic resin and the second thermoplastic resin have different properties from one another.

7. A method for injection-molding a molded article having a hollow portion, said method comprising:
    providing a mold assembly having a cavity disposed between a first molten resin injection portion and a second molten resin injection portion, and a pressurized-fluid introducing portion provided at an opening of the cavity;
    injecting a first molten thermoplastic resin from a first injection cylinder into the cavity through the first-molten-resin injection portion;
    injecting a second molten thermoplastic resin from a second injection cylinder into the cavity through the second-molten-resin injection portion, without bringing the second molten thermoplastic resin into contact with the first molten thermoplastic resin injected into the cavity, concurrently with inception of said injecting the first molten thermoplastic resin into the cavity, during said injecting the first molten thermoplastic into the cavity, or after completion of said injecting the first molten thermoplastic into the cavity; and
    introducing the pressurized fluid into the second molten thermoplastic resin in the cavity from the pressurized-fluid introducing portion during said injecting the second molten thermoplastic resin into the cavity or after completion of said injecting the second molten thermoplastic resin into the cavity thereby to form the hollow portion only inside the second molten thermoplastic resin, which hollow portion does not extend to the first molten thermoplastic resin, and to bring the second molten thermoplastic resin into contact with the first molten thermoplastic resin.

8. The method according to claim 7, wherein the first molten thermoplastic resin comes into contact with the second molten thermoplastic resin in said introducing a pressurized fluid into the second molten thermoplastic resin in the cavity, the first molten thermoplastic resin being in a molten state upon coming into contact with the second molten thermoplastic resin.

9. The method according to claim 7, wherein a portion of the first molten thermoplastic resin comes into contact with the second molten thermoplastic resin in said introducing the pressurized fluid into the second molten thermoplastic resin in the cavity, the portion of the first of the first molten thermoplastic resin coming into a re-melted state due to the contact thereof with the second molten thermoplastic resin.

10. The method according to claim 7, wherein the first molten thermoplastic resin comes in contact with the second molten thermoplastic resin after the start of said introducing the pressurized fluid into the second molten thermoplastic resin in the cavity.

11. The method according to claim 7, wherein the first molten thermoplastic resin comes in contact with the second molten thermoplastic resin on or around a time of completion of said injecting the second molten thermoplastic resin into the cavity.

12. The method according to claim 7, wherein the first thermoplastic resin and the second thermoplastic resin have different properties from one another.

13. A method for injection-molding a molded article having a hollow portion by means of an injection-molding apparatus, said apparatus comprising:
a mold assembly having a first-molten-resin injection portion for injecting a first molten thermoplastic resin into a cavity of the mold assembly, a second-molten-resin injection portion for injecting a second molten thermoplastic resin into the cavity, and a pressurized-fluid introducing portion for introducing a pressurized fluid into the second molten thermoplastic resin injected into the cavity;
a first injection cylinder communicating with the first-molten-resin injection portion, and a second injection cylinder communicating with the second-molten-resin injection portion; and
a movable partition member to be disposed in a portion of the cavity which is between a first cavity portion in which the first molten thermoplastic resin can occupy in the cavity and a second cavity portion in which the second molten thermoplastic resin can occupy in the cavity, the first-molten-resin injection portion and the second-molten-resin injection portion being disposed on opposite sides of the movable partition member, respectively;
said method comprising:
disposing the movable partition member in the portion of the cavity which is between the first cavity portion in which the first molten thermoplastic resin can occupy in the cavity and the second cavity portion in which the second molten thermoplastic resin can occupy in the cavity;
injecting the first molten thermoplastic resin from the first injection cylinder into the first cavity portion through the first-molten-resin injection portion;
extracting the partition member from the cavity;
injecting the second molten thermoplastic resin into the portion of the cavity in which the partition member occupied and into the second cavity portion from the second injection cylinder through the second-molten-resin injection portion; and
introducing the pressurized fluid into the second molten thermoplastic resin in the cavity from the pressurized-fluid introducing portion during the injection of the second molten thermoplastic resin or after completion of the injection thereof to thereby form the hollow portion inside the second thermoplastic resin.

14. The method according to claim 13, in which in said extracting said partition member from the cavity, the partition member is extracted from the cavity after the first molten thermoplastic resin is solidified to such an extent that movement of the partition member does not impair a form of the first molten thermoplastic resin.

15. The method according to claim 13, in which in said injecting the second molten thermoplastic resin, a portion of the first molten thermoplastic resin which portion comes in contact with the second molten thermoplastic resin comes to be in a re-melted state due to its contact with the second molten thermoplastic resin.

16. The method according to claim 13, in which a surface of the partition member which is to come in contact with the first molten thermoplastic resin has convexo-concave shapes.

17. The method according to claim 13, in which a direction in which the partition member is movable is nearly at right angles with the direction of a pressure exerted on the partition member by the first molten thermoplastic resin injected from the first-molten-resin injection portion into the first cavity portion.

18. A method for injection-molding a molded article having a hollow portion by means of an injection-molding apparatus, said apparatus comprising:
a mold assembly having a first-molten-resin injection portion for injecting a first molten thermoplastic resin into a cavity of the mold assembly, a second-molten-resin injection portion for injecting a second molten thermoplastic resin into the cavity, and a pressurized-fluid introducing portion for introducing a pressurized fluid into the second molten thermoplastic resin injected into the cavity;
a first injection cylinder communicating with the first-molten-resin injection portion;
a second injection cylinder communicating with the second-molten-resin injection portion; and
a movable partition member to be disposed in a portion of the cavity which is between a first cavity portion in which the first molten thermoplastic resin can occupy in the cavity and a second cavity portion in which the second molten thermoplastic resin can occupy in the cavity, the first-molten-resin injection portion and the second-molten-resin injection portion being disposed on opposite sides of the movable partition member, respectively;
said method comprising:
disposing the movable partition member in the portion of the cavity which is between the first cavity portion in which the first molten thermoplastic resin can occupy in the cavity and the second cavity portion in which the second molten thermoplastic resin can occupy in the cavity;
injecting the second molten thermoplastic resin from the second injection cylinder into the second cavity portion through the second-molten-resin injection portion;
introducing the pressurized fluid into the second molten thermoplastic resin in the second cavity portion from the pressurized-fluid introducing portion during the injection of the second molten thermoplastic resin into the second cavity portion or after completion of the injection thereof to thereby form the hollow portion inside the second thermoplastic resin;

extracting the partition member from the cavity; and injecting the first molten thermoplastic resin into the portion of the cavity in which the partition member occupied and into the first cavity portion from the first injection cylinder through the first-molten-resin injection portion.

19. The method according to claim 18, in which said extracting said partition member from the cavity is preceded by discharging of the pressurized fluid from the hollow portion formed inside the second thermoplastic resin.

20. The method according to claim 18, in which in said extracting said partition member from the cavity, the partition member is extracted from the cavity after the second thermoplastic resin is solidified to such an extent that movement of the partition member does not impair a form of the second thermoplastic resin.

21. The method according to claim 18, in which in said injecting the first molten thermoplastic resin, a portion of the second thermoplastic resin comes into contact with the first molten thermoplastic resin such that the portion of the second molten thermoplastic resin comes to be in a re-melted state due to its contact with the first molten thermoplastic resin.

22. The method according to claim 18, in which a surface of the partition member which is to come in contact with the second molten thermoplastic resin has convexo-concave shapes.

23. The method according to claim 18, in which a direction in which the partition member is movable is nearly at right angles with the direction of a pressure exerted on the partition member by the second molten thermoplastic resin injected from the second-molten-resin injection portion into the second cavity portion, or at right angles with the direction of a pressure exerted on the partition member by the pressurized fluid introduced from the pressurized-fluid introducing portion.

* * * * *